US006388032B1

(12) United States Patent
Yamaura et al.

(10) Patent No.: US 6,388,032 B1
(45) Date of Patent: May 14, 2002

(54) CYCLIC OLEFIN POLYMER CONTAINING LITTLE CATALYST RESIDUE

(75) Inventors: Michio Yamaura; Kiyonari Hashidzume; Hideaki Nitta; Masaki Takeuchi; Kaoru Iwata, all of Hino (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/529,492

(22) PCT Filed: Oct. 16, 1998

(86) PCT No.: PCT/JP98/04686
§ 371 Date: Apr. 14, 2000
§ 102(e) Date: Apr. 14, 2000

(87) PCT Pub. No.: WO99/20662
PCT Pub. Date: Apr. 29, 1999

(30) Foreign Application Priority Data

Oct. 16, 1997 (JP) .............................................. 9-283489
Mar. 27, 1998 (JP) ............................................ 10-081590

(51) Int. Cl.[7] .............................. C08F 4/62; C08F 4/70; C08F 32/00; C08F 132/00; C08F 232/00
(52) U.S. Cl. ....................... 526/160; 526/134; 526/169; 526/169.1; 526/169.2; 526/280; 526/281; 526/282; 526/283; 526/308; 526/174; 526/176; 526/177; 210/729
(58) Field of Search ................................. 526/134, 160, 526/169, 169.1, 169.2, 280, 281, 282, 283, 308, 174, 176, 177; 210/729

(56) References Cited

U.S. PATENT DOCUMENTS 3,901,859 A    8/1975   Alberti et al.
5,164,469 A *  11/1992  Goto et al. ................. 526/281

FOREIGN PATENT DOCUMENTS

| GB | 804081   | 11/1958  |
| GB | 867027   | * 5/1961 |
| JP | 52-69488 | 6/1977   |
| JP | 52069488 | 6/1977   |
| JP | 62045602 | 8/1985   |
| JP | 62-45602 | 2/1987   |
| JP | 2024319  | 7/1988   |
| JP | 3066725  | 8/1989   |
| JP | 405103   | 6/1990   |
| JP | 4161421  | 10/1990  |
| JP | 6100668  | 9/1992   |
| JP | 4363312  | 12/1992  |
| JP | 6228235  | 1/1993   |
| JP | 7109310  | 10/1993  |

OTHER PUBLICATIONS

International Search Report from PCT/JP98/04686, 1999.

* cited by examiner

Primary Examiner—David W. Wu
Assistant Examiner—R. Rabago
(74) Attorney, Agent, or Firm—Sughrue Mion, PLLC

(57) ABSTRACT

A cyclic olefin polymer having a small content of a catalyst residue, a production process for the same and use of the same as an optical material. Catalysts used for polymerization and/or hydrogenation reaction for forming the cyclic olefin polymer are decomposed efficiently by adding at least one compound selected from the group consisting of an α-oxyacid and β-oxyacid having one hydroxyl group and one carboxyl group in the molecule and derivatives obtained by substituting hydroxyl group thereof by an alkoxyl group, and the decomposition products are removed by rendering them insoluble in a reaction solvent used for the polymerization and/or hydrogenation reaction and precipitating them efficiently.

32 Claims, 10 Drawing Sheets

CYCLIC OLEFIN POLYMER CONTAINING LITTLE CATALYST RESIDUE

TECHNICAL FIELD

The present invention relates to a purified cyclic olefin polymer and to applications and production process thereof. More specifically, it relates to a cyclic olefin polymer containing substantially no catalyst residue and to applications and production process thereof.

BACKGROUND ART

Cyclic olefin polymers having a bulky cyclic olefin as one of constituent elements are a synthetic resin which is excellent in transparency, heat resistance, chemical resistance, solvent resistance, humidity resistance, dielectric characteristics and various mechanical properties and widely used in various fields.

These cyclic olefin polymers can be mainly classified into addition copolymers, ring-opened polymers and hydrogenated ones thereof according to structure. The addition copolymers are produced by addition copolymerization of a cyclic olefin and an α-olefin in a hydrocarbon solvent in the presence of a catalyst selected from a Ziegler catalyst and a metallocene catalyst. The ring-opened polymers are produced by ring-opening polymerization of a cyclic olefin in a hydrocarbon solvent in the presence of a metathesis catalyst. The hydrogenated polymers are produced by reacting double bonds between carbons contained in an addition copolymer or ring-opened polymer produced from a cyclic olefin containing two or more double bonds between carbons with hydrogen in the presence of a catalyst selected from a Ziegler catalyst and a metallocene catalyst to saturate the double bonds. The heat resistance, weatherability and light resistance of a cyclic olefin polymer can be further improved by saturating the double bonds.

In the production process of a cyclic olefin polymer, the removal of a catalyst metal is an extremely important step to maintain such properties as transparency, weatherability, humidity resistance and heat resistance of a resin. The following methods have been proposed heretofore to remove the catalyst metal:

(1) one comprising the steps of injecting a polymer solution into a large amount of a poor solvent to deposit a copolymer precipitate and washing the precipitate with a poor solvent;

(2) one comprising the steps of washing a polymer solution with water containing an acid to extract and remove the catalyst residue (refer to JP-A 2-24319 and JP-A 6-100668);

(3) one comprising the steps of washing a polymer solution with water containing an alcohol or the like to extract and remove the catalyst residue (refer to JP-A 4-45103 and JP-A 6-228235);

(4) one comprising the steps of adding an oxidizing agent or basic compound to a polymer solution to extract and remove the catalyst residue with a poor solvent (refer to JP-A 7-109310); and (5) one comprising the steps of adding an alcohol, water and the like to a polymer solution, further adding an adsorbent and a filter aid thereto, and removing the catalyst residue by filtration or centrifugation (refer to JP-A 3-66725, JP-A 4-161421 and JP-A 4-363312).

As for the method (1), the poor solvent must be used at least several more times in quantity than the polymer solution, which is a great burden in terms of equipment and cost when it is carried out on an industrial scale, including the recovery of the poor solvent, and purification efficiency is not so high. As for the methods (2), (3) and (4), a waste solution containing a relatively large amount of a catalyst metal is generated, thereby posing a great problem with the disposal of the waste solution. As for the method (5), although a large amount of a waste solution is not produced, the purification efficiency is not so high unless large amounts of the adsorbent and the filter aid are used, smooth filtration is difficult to carry out, and problems occur with regard to the disposal of the filter aid and the recovery of the polymer. Generally speaking, catalyst components used to produce a cyclic olefin polymer include an organic aluminum compound such as an alkyl aluminum or alkyl aluminoxane, and the amount of the organic aluminum compound is larger by far than other catalyst components. The organic aluminum compound extremely readily reacts with water, alcohol or acid and becomes insoluble in a hydrocarbon solvent used in the polymerization reaction. However, its reaction product generally separates out as a gel containing a large amount of the solvent and, in most cases, looks like a homogeneous reaction solution with naked eyes. Therefore, if the reaction solution is directly filtered, the filter is clogged and smooth filtration is almost impossible. Therefore, an adsorbent and a filter aid must be used in most cases.

DISCLOSURE OF THE INVENTION

It is an object of the present invention to provide a process for producing a cyclic olefin polymer having a small content of a catalyst residue, which generates almost no waste solution containing a large amount of a metal and can remove the catalyst residue efficiently by simple means.

It is another object of the present invention to provide a process for producing a cyclic olefin polymer having a small content of a catalyst residue, which can remove catalysts used for polymerization and/or hydrogenation reaction for producing the cyclic olefin polymer by decomposing the catalysts efficiently and rendering the decomposition products insoluble in a reaction solvent used for the polymerization and/or hydrogenation reaction to precipitate them efficiently.

It is still another object of the present invention to provide a process for producing a cyclic olefin polymer having a small content of a catalyst residue, which generates substantially no colored decomposition product by-produced by the decomposition of the above catalysts or can remove the colored decomposition product by adsorbing it to catalyst decomposition products or embracing it in the catalyst decomposition products even if it is generated.

It is a further object of the present invention to provide a process for producing a cyclic olefin polymer having a small content of a catalyst residue, which can produce the above catalyst decomposition products in the form of not a markedly swollen gel but a solid which can be easily filtered.

It is a still further object of the present invention to provide a process for producing a cyclic olefin polymer having a small content of a catalyst residue, which can nearly completely remove even a stable compound such as tris(acetylacetonate)aluminum which is inevitably by-produced when an acetylacetonate complex and an organic aluminum compound are used.

It is a still further object of the present invention to provide a cyclic olefin polymer having a small content of a catalyst residue.

It is a still further object of the present invention to provide use of the cyclic olefin polymer of the present invention as an optical material.

Other objects and advantages of the present invention will become apparent from the following description.

According to the present invention, firstly, the above objects and advantages of the present invention are attained by a process for producing a cyclic olefin polymer in the presence of a transition metal catalyst component soluble in an organic solvent and an organic aluminum compound as catalysts, the process comprising the steps of adding at least one compound selected from the group consisting of an α-oxyacid and β-oxyacid, which have one hydroxyl group and one carboxyl group in the molecule, and derivatives obtained by substituting hydroxyl groups thereof with alkoxyl groups, to a reaction product to precipitate a compound containing a transition metal and aluminum, and separating the precipitate by filtration.

Figure 1:
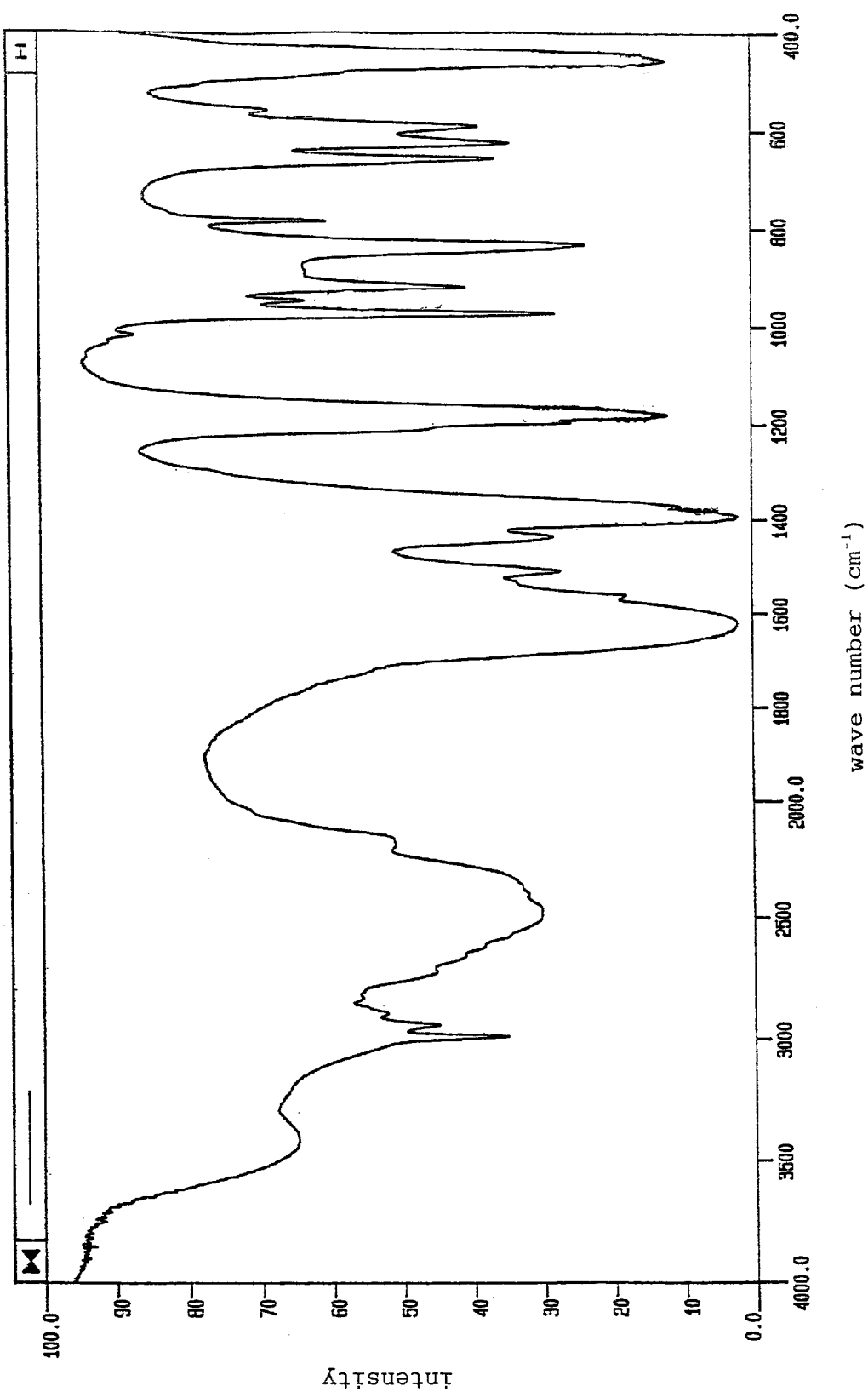
FIG. 1 shows the infrared absorption spectrum of an achromatic solid obtained in Reference Example 1.

The process of the present invention will be described in detail hereunder.

(Organic Aluminum Compound)

The organic aluminum compound used in the present invention is a compound having at least one aluminum-carbon bond in the molecule. Illustrative examples of the organic aluminum compound include trialkyl aluminum compounds such as triethyl aluminum and triisobutyl aluminum; organic aluminum alkoxide compounds such as diethyl aluminum ethoxide, diisobutyl aluminum butoxide and ethyl aluminum sesquiethoxide; organic aluminum oxy compounds such as methyl aluminoxane and ethyl aluminoxane; and organic aluminum halide compounds such as diethyl aluminum chloride, diisobutyl aluminum chloride, ethyl aluminum sesquichloride, butyl aluminum sesquichloride, ethyl aluminum dichloride and isobutyl aluminum dichloride.

(Transition Metal Catalyst Component)

The transition metal catalyst component used in the present invention is not particularly limited as long as it has the catalytic function of producing a cyclic olefin polymer in the presence of an organic aluminum compound and is soluble in an organic solvent. The transition metal catalyst component is preferably a metallocene catalyst component, metathesis catalyst component or Ziegler catalyst component. Both the metallocene catalyst component and the Ziegler catalyst component are the catalyst components of a catalyst for an addition copolymerization reaction between a cyclic olefin and an α-olefin and a hydrogenation reaction of a polymer, and the metathesis catalyst component is the catalyst component of a catalyst for a ring-opening polymerization reaction of a cyclic olefin. The metallocene catalyst component, metathesis catalyst component and Ziegler catalyst component will be described in detail hereunder.

(Metallocene Catalyst Component)

The metallocene catalyst component used in the present invention can be classified into those suitable for addition copolymerization or those suitable for use as a hydrogenation catalyst according to reaction system.

The metallocene catalyst components suitable for addition copolymerization are preferably represented by the following general formula (III):

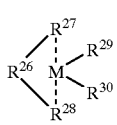

(III)

wherein M is a transition metal selected from the group 4 of the periodic table, $R^{29}$ and $R^{30}$ are the same or different and are each a hydrogen atom, halogen atom, saturated or unsaturated hydrocarbon group having 1 to 12 carbon atoms, alkoxyl group having 1 to 12 carbon atoms or aryloxy group having 6 to 12 carbon atoms, $R^{27}$ and $R^{28}$ are the same or different and are each a monocyclic or polycyclic hydrocarbon group which can form a sandwich structure with the central metal M, and $R^{26}$ is a bridge for connecting the group $R^{27}$ with the group $R^{28}$ and selected from the following structures:

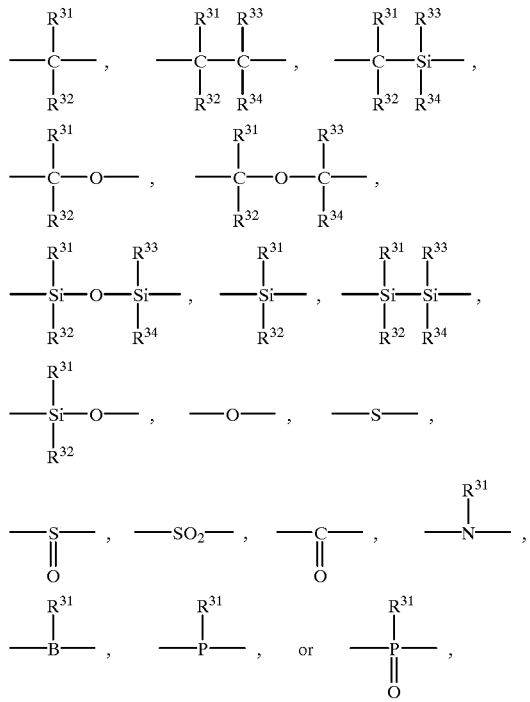

($R^{31}$ to $R^{34}$ are the same or different and are each a hydrogen atom, halogen atom, saturated or unsaturated hydrocarbon group having 1 to 12 carbon atoms, alkoxy group having 1 to 12 carbon atoms or aryloxy group having 6 to 12 carbon atoms, with the proviso that $R^{31}$ and $R^{32}$, or $R^{33}$ and $R^{34}$ may form a ring).

In the metallocene catalyst component represented by the above formula (III), the central metal M is the group 4 transition metal such as zirconium, titanium or hafnium, out of which zirconium is the most preferable from the viewpoint of catalytic activity. $R^{29}$ and $R^{30}$ may be the same or different and is preferably an alkyl group having 1 to 6 carbon atoms or a halogen atom (especially chlorine atom). Preferable cyclic hydrocarbon groups as $R^{27}$ and $R^{28}$ are a cyclopentadienyl group, indenyl group and fluorenyl group. They may be substituted by a hydrogen atom, an alkyl group such as a methyl group, ethyl group, isopropyl group or tert-butyl group, or substituent such as a phenyl group or benzyl group. $R^{31}$ to $R^{34}$ are preferably a hydrogen atom, alkyl group having 1 to 6 carbon atoms or phenyl group. $R^{26}$ is preferably a lower alkylene group such as a methylene group, ethylene group or propylene group, alkylidene group such as isopropylidene, substituted alkylene group such as diphenylmethylene, silylene group or substituted silylene group such as dimethylsilylene or diphenylsilylene.

The following compounds can be enumerated as examples of the metallocene whose central metal M is zirconium:

dimethysilylene-bis(1-indenyl)zirconium dichloride, diphenylsilylene-bis(1-indenyl)zirconium dichloride, dibenzylsilylene-bis(1-indenyl)zirconium dichloride, methylene-bis(1-indenyl)zirconium dichloride, ethylene-bis(1-indenyl)zirconium dichloride, diphenylmethylene-bis(1-indenyl)zirconium dichloride, isopropylidene-bis(1-indenyl)zirconium dichloride, phenylmethylsilylene-bis(1-indenyl)zirconium dichloride, dimethylsilylene-bis[1-(2,4,7-trimethyl)indenyl]zirconium dichloride, diphenylsilylene-bis[1-(2,4,7-trimethyl)indenyl]zirconium dichloride, dibenzylsilylene-bis[1-(2,4,7-trimethyl)indenyl]zirconium dichloride, methylene-bis[1-(2,4,7-trimethyl)indenyl]zirconium dichloride, ethylene-bis[1-(2,4,7-trimethyl)indenyl]zirconium dichloride, diphenylmethylene-bis[1-(2,4,7-trimethyl)indenyl]zirconium dichloride, isopropylidene-bis[1-(2,4,7-trimethyl)indenyl]zirconium dichloride, phenylmethylsilylene-bis[1-(2,4,7-trimethyl)indenyl]zirconium dichloride, dimethylsilylene-bis[1-(2,4-dimethyl)indenyl]zirconium dichloride, diphenylsilylene-bis[1-(2,4-dimethyl)indenyl]zirconium dichloride, dibenzylsilylene-bis[1-(2,4-dimethyl)indenyl]zirconium dichloride, methylene-bis[1-(2,4-dimethyl) indenyl]zirconium dichloride, ethylene-bis[1-(2,4-dimethyl) indenyl]zirconium dichloride, diphenylmethylene-bis[1-(2,4-dimethyl)indenyl]zirconium dichloride, isopropylidene-bis[1-(2,4-dimethyl) indenyl]zirconium dichloride, phenylmethylsilylene-bis[1-(2,4-dimethyl)indenyl]zirconium dichloride, dimethylsilylene-bis[1-(4,5,6,7-tetrahydro) indenyl]zirconium dichloride, diphenylsilylene-bis[1-(4,5,6,7-tetrahydro)indenyl]zirconium dichloride, dibenzylsilylene-bis[1-(4,5,6,7-tetrahydro)indenyl]zirconiumdichloride, methylene-bis[1-(4,5,6,7-tetrahydro)indenyl]zirconium dichloride, ethylene-bis[1-(4,5,6,7-tetrahydro)indenyl] zirconium dichloride, diphenylmethylene- bis[1-(4,5,6,7-tetrahydro)indenyl]zirconium dichloride, isopropylidene-bis [1-(4,5,6,7-tetrahydro)indenyl]zirconium dichloride, phenylmethylsilylene-bis[1-(4,5,6,7-tetrahydro) indenyl] zirconium dichloride, dimethylsilylene-(9-fluorenyl) (cyclopentadienyl)zirconium dichloride, diphenylsilylene-(9-fluorenyl)(cyclopentadienyl)zirconium dichloride, dibenzylsilylene-(9-fluorenyl)(cyclopentadienyl)zirconium dichloride, methylene-(9-fluorenyl)(cyclopentadienyl) zirconium dichloride, ethylene-(9-fluorenyl) (cyclopentadienyl) zirconium dichloride, diphenylmethylene-(9-fluorenyl)(cyclopentadienyl) zirconium dichloride, isopropylidene-(9-fluorenyl) (cyclopentadienyl)zirconium dichloride, phenylmethylsilylene-(9-fluorenyl) (cyclopentadienyl) zirconium dichloride, dimethylsilylene-(9-fluorenyl)[1-(3-tert-butyl)cyclopentadienyl]zirconium dichloride, diphenylsilylene-(9-fluorenyl)[1-(3-tert-butyl) cyclopentadienyl]zirconium dichloride, dibenzylsilylene-(9-fluorenyl)[1-(3-tert-butyl)cyclopentadienyl]zirconium dichloride, methylene-(9-fluorenyl)[1-(3-tert-butyl) cyclopentadienyl]zirconium dichloride, ethylene-(9-fluorenyl)[1-(3-tert-butyl)cyclopentadienyl]zirconium dichloride, diphenylmethylene-(9-fluorenyl)[1-(3-tert-butyl)cyclopentadienyl]zirconium dichloride, isopropylidene-(9-fluorenyl)[1-(3-tert-butyl) cyclopentadienyl]zirconium dichloride, phenylmethylsilylene-(9-fluorenyl)[1-(3-tert-butyl) cyclopentadienyl]zirconium dichloride, dimethylsilylene-(9-fluorenyl)[1-(3-methyl)cyclopentadienyl]zirconium dichloride, diphenylsilylene-(9-fluorenyl)[1-(3-methyl) cyclopentadienyl]zirconium dichloride, dibenzylsilylene-(9-fluorenyl)[1-(3-methyl)cyclopentadienyl]zirconium dichloride, methylene-(9-fluorenyl)[1-(3-methyl) cyclopentadienyl]zirconium dichloride, ethylene-(9-fluorenyl)[1-(3-methyl)cyclopentadienyl]zirconium dichloride, diphenylmethylene-(9-fluorenyl)[1-(3-methyl) cyclopentadienyl]zirconium dichloride, isopropylidene-(9-fluorenyl)[1-(3-methyl)cyclopentadienyl]zirconium dichloride, phenylmethylsilylene-(9-fluorenyl)[1-(3-methyl)cyclopentadienyl]zirconium dichloride, dimethylsilylene-[9-(2,7-di-tert-butyl)fluorenyl] (cyclopentadienyl)zirconium dichloride, diphenylsilylene-[9-(2,7-di-tert-butyl)fluorenyl](cyclopentadienyl)zirconium dichloride, dibenzylsilylene-[9-(2,7-di-tert-butyl)fluorenyl] (cyclopentadienyl)zirconium dichloride, methylene-[9-(2,7-di-tert-butyl)fluorenyl](cyclopentadienyl)zirconium dichloride, ethylene-[9-(2,7-di-tert-butyl)fluorenyl] (cyclopentadienyl)zirconium dichloride, diphenylmethylene-[9-(2,7-di-tert-butyl)fluorenyl] (cyclopentadienyl)zirconium dichloride, isopropylidene-[9-(2,7-di-tert-butyl)fluorenyl](cyclopentadienyl)zirconium dichloride, phenylmethylsilylene-[9-(2,7-di-tert-butyl) fluorenyl](cyclopentadienyl)zirconium dichloride, dimethylsilylene-(1-indenyl)(cyclopentadienyl)zirconium dichloride, diphenylsilylene-(1-indenyl)(cyclopentadienyl) zirconium dichloride, dibenzylsilylene-(1-indenyl) (cyclopentadienyl)zirconium dichloride, methylene-(1-indenyl)(cyclopentadienyl)zirconium dichloride, ethylene-(1-indenyl)(cyclopentadienyl)zirconium dichloride, diphenylmethylene-(1-indenyl)(cyclopentadienyl) zirconium dichloride, isopropylidene-(1-indenyl) (cyclopentadienyl)zirconium dichloride, phenylmethylsilylene-(1-indenyl)(cyclopentadienyl) zirconium dichloride, dimethylsilylene-bis (cyclopentadienyl)zirconium dichloride, diphenylsilylene-bis(cyclopentadienyl)zirconium dichloride, dibenzylsilylene-bis(cyclopentadienyl)zirconium dichloride, methylene-bis(cyclopentadienyl)zirconium dichloride, ethylene-bis(cyclopentadienyl)zirconium dichloride, diphenylmethylene-bis(cyclopentadienyl) zirconium dichloride, isopropylidene-bis(cyclopentadienyl) zirconium dichloride, phenylmethylsilylene-bis (cyclopentadienyl)zirconium dichloride, isopropylidene-(1-indenyl)[1-(3-tert-butyl)cyclopentadienyl]zirconium dichloride, isopropylidene-(9-fluorenyl)[1-(3-isopropyl)

cyclopentadienyl]zirconium dichloride, isopropylidene-[1-(2,4,7-trimethyl)indenyl](cyclopentadienyl)zirconium dichloride, ethylene-(cyclopentadienyl)[1-(3-tert-butyl) cyclopentadienyl]zirconium dichloride, ethylene-(cyclopentadienyl)[1-(3-phenyl)cyclopentadienyl] zirconium dichloride, isopropylidene-(9-fluorenyl) (cyclopentadienyl)zirconium dibromide, dimethylsilylene-bis(1-indenyl)zirconium dibromide and ethylene-bis(1-indenyl)methyl zirconium monochloride.

In the present invention, isopropylidene-(9-fluorenyl) (cyclopentadienyl)zirconium dichloride, diphenylmethylene-(9-fluorenyl)(cyclopentadienyl) zirconiumdichloride, isopropylidene-(9-fluorenyl)[1-(3-methyl)cyclopentadienyl]zirconium dichloride, isopropylidene-(9-fluorenyl)[1-(3-tert-butyl) cyclopentadienyl]zirconium dichloride, isopropylidene-(1-indenyl)(cyclopentadienyl)zirconium dichloride, dimethylsilylene-bis(1-indenyl)zirconium dichloride, ethylene-bis(1-indenyl)zirconium dichloride and isopropylidene-bis(1-indenyl)zirconium dichloride are particularly preferable as the metallocene.

The amount of the metallocene catalyst component may be determined according to its polymerization activity. It is used in an amount of $10^{-6}$ to $10^{-2}$ mole, preferably $10^{-5}$ to $10^{-3}$ mole, per mole of the cyclic olefin added to a polymerization reaction system.

The organic aluminum compound is preferably an organic aluminum oxy compound such as an alkyl aluminoxane or trialkyl aluminum, out of those listed above.

When an alkyl aluminoxane is used as the organic aluminum compound, it is used in combination with a metallocene catalyst component. When a trialkyl aluminum is used, it is used in combination with a metallocene catalyst component and an ionic boron compound.

The alkyl aluminoxane can be represented by the general formula (IV) for a linear structure or the general formula (V) for a cyclic structure:

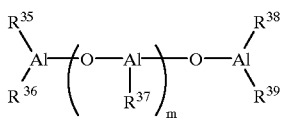

(IV)

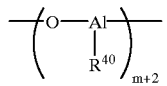

(V)

wherein $R^{35}$ to $R^{40}$ are the same or different and are each an alkyl group having 1 to 6 carbon atoms such as a methyl group, ethyl group, propyl group or butyl group, phenyl group or benzyl group, preferably a methyl group or ethyl group and particularly preferably a methyl group, and m is an integer of 2 or more, preferably 5 to 100.

However, the exact structure of the alkyl aluminoxane is unknown.

The alkyl aluminoxane can be produced by a conventionally known method, for example, reacting a compound containing adsorbed water or a salt (such as copper sulfate hydrate) containing crystallization water with an organic aluminum compound such as trialkyl aluminum in an inert solvent (such as toluene). The alkyl aluminoxane may contain a small amount of an organic aluminum compound derived from the production method.

The alkyl aluminoxane has the function of alkylating the metallocene catalyst component and further rendering the metallocene catalyst component cationic, thereby obtaining polymerization activity. The activation of the metallocene catalyst component is carried out in a solution, preferably by dissolving the metallocene catalyst component in an alkyl aluminoxane solution. A solvent used for the activation is preferably an aliphatic hydrocarbon or aromatic hydrocarbon, the most preferably toluene. The metallocene catalyst component is generally activated by the alkyl aluminoxane before used in a polymerization reaction. The activation time is one minute to 10 hours, preferably 3 minutes to one hour. The activation temperature is −40 to 110° C., preferably 0 to 80° C.

As for the ratio of the alkyl aluminoxane to the metallocene catalyst component, the alkyl aluminoxane is used in an amount of 30 to 20,000 moles, preferably 100 to 5,000 moles, per mole of the metallocene catalyst component. The use of the alkyl aluminoxane in too small a quantity based on the metallocene catalyst component cannot provide sufficiently high polymerization activity disadvantageously. On the other hand, the use of the alkyl aluminoxane in too large a quantity, though polymerization activity is high, is uneconomical because it is expensive and makes purification after polymerization difficult to carry out.

Preferable organic aluminum compounds other than the alkyl aluminoxane include trialkyl aluminum such as triethyl aluminum or triisobutyl aluminum. In this case, an ionic boron compound must be used in combination.

The ionic boron compound is represented by any one of the following general formulae (VI) to (IX):

 (VI)

 (VII)

 (IIX)

 (IX)

wherein $R^{41}$'s are the same or different and are each an aliphatic hydrocarbon group having 1 to 8 carbon atoms or aromatic hydrocarbon group having 6 to 18 carbon atoms, $R^{42}$'s are the same or different and are each an aromatic hydrocarbon group having 6 to 18 carbon atoms, and x is 1, 2, 3 or 4.

In the ionic boron compound represented by any one of the above formulae (VI) to (IX), $R^{41}$'s are preferably the same and are each an alkyl group such as a methyl group, ethyl group, propyl group or butyl group, or an aryl group such as a phenyl group. $R^{42}$'s are preferably the same and are each a fluorinated or partly fluorinated aromatic hydrocarbon group, particularly preferably a pentafluorophenyl group. x is preferably 3. Illustrative examples of the compound include N,N-dimethylanilinium-tetrakis (pentafluorophenyl)borate, trityl-tetrakis (pentafluorophenyl)borate and lithium-tetrakis (pentafluorophenyl)borate.

The ionic boron compound has the function of rendering the metallocene catalyst component cationic, and the organic aluminum compound has the function of alkylating the metallocene catalyst component. Therefore, polymerization activity can be obtained by combining these compounds.

As for the ratio of the ionic boron compound to the metallocene catalyst component, the ionic boron compound is used in an amount of 0.5 to 10 moles, preferably 0.8 to 5 moles, more preferably 0.9 to 3 moles, per mole of the metallocene catalyst component. The organic aluminum compound is used in an amount of 2 to 500 moles per mole of metallocene. When the ionic boron compound is used, there is a tendency that the required amount of the organic aluminum compound based on the metallocene catalyst component is much smaller and catalytic activity is higher than when an alkyl aluminoxane is used as the organic aluminum compound. Therefore, the use of the ionic boron compound is economically advantageous because the amount of the metallocene catalyst component and the amount of the co-catalyst can be reduced and is also very advantageous in terms of purification after polymerization.

Meanwhile, a compound represented by the following general formula (X) is preferably used as the metallocene catalyst component suitable for a hydrogenation reaction, in addition to the compound represented by the above general formula (III).

(X)

In the metallocene catalyst components represented by the above formulae (III) and (X), the central metal M is the transition metal of the group 4 of the periodic table such as titanium, zirconium or hafnium, preferably titanium, from the viewpoint of catalytic activity. $R^{45}$ and $R^{46}$ may be the same or different and are preferably an alkyl group having 1 to 8 carbon atoms, aryl group or halogen atom (particularly chlorine atom). Preferable examples of the cyclic hydrocarbon group represented by $R^{43}$ and $R^{44}$ include a cyclopentadienyl group, indenyl group and fluorenyl group. They may be substituted by a hydrogen atom, an alkyl group such as a methyl group, ethyl group, isopropyl group or tert-butyl group, or a substituent such as a phenyl group or benzyl group.

The following compounds can be enumerated as examples of the metallocene whose central metal M is titanium, that is, titanocene:

bis(cyclopentadienyl)titanium dichloride,
bis(cyclopentadienyl)titanium dimethyl,
bis(cyclopentadienyl)titanium diphenyl,
bis(cyclopentadienyl)titanium ditolyl,
bis(methylcyclopentadienyl)titanium dichloride,
bis(methylcyclopentadienyl)titanium dimethyl,
bis(methylcyclopentadienyl)titanium diphenyl,
bis(methylcyclopentadienyl)titanium ditolyl,
bis(butylcyclopentadienyl)titanium dichloride,
bis(butylcyclopentadienyl)titanium dimethyl,
bis(butylcyclopentadienyl)titanium diphenyl,
bis(butylcyclopentadienyl)titanium ditolyl,
bis(pentamethylcyclopentadienyl)titanium dichloride,
bis(pentamethylcyclopentadienyl)titanium dimethyl,
bis(pentamethylcyclopentadienyl)titanium diphenyl,
bis(pentamethylcyclopentadienyl)titanium ditolyl,
(cyclopentadienyl)(pentamethylcyclopentadienyl) titanium dichloride,
(cyclopentadienyl)(pentamethylcyclopentadienyl) titanium dimethyl, (cyclopentadienyl)
(pentamethylcyclopentadienyl)titanium diphenyl and
(cyclopentadienyl)(pentamethylcyclopentadienyl) titanium ditolyl.

Of these, bis(cyclopentadienyl)titanium dichloride, bis(cyclopentadienyl)titanium diphenyl and bis(cyclopentadienyl)titanium ditolyl are particularly preferable because they are relatively easy to handle and have high activity.

The amount of the metallocene catalyst component may be determined according to its polymerization activity. It is used in an amount of $10^{-6}$ to $10^{-2}$ mole, preferably $10^{-5}$ to $10^{-3}$ mole, per mole of the cyclic olefin added to the polymerization reaction system.

When used as a hydrogenation catalyst, the metallocene catalyst component is preferably used in combination with an organo lithium compound to improve its catalytic activity. The organo lithium compound is a compound having a lithium atom bonded to a hydrocarbon group. Illustrative examples of the organo lithium compound include monolithium compounds such as methyl lithium, ethyl lithium, propyl lithium, isopropyl lithium, butyl lithium, sec-butyl lithium, tert-butyl lithium, pentyl lithium, phenyl lithium and benzyl lithium; and dilithium compounds such as 1,4-dilithiobutane, 1,5-dilithiopentane and 1,2-dilithiodiphenylethane. Of these, methyl lithium, butyl lithium, sec-butyl lithium and tert-butyl lithium are particularly preferable because they are easy to acquire.

As for the ratio of the organo lithium compound to the metallocene catalyst component, the organo lithium compound is used in an amount of 1.0 to 20 moles, preferably 1.5 to 10 moles, per mole of the metallocene catalyst component. The use of the organo lithium compound in too small a quantity based on the metallocene catalyst component cannot provide sufficiently high polymerization activity disadvantageously. On the other hand, the use of the organo lithium compound in too large a quantity is also disadvantageous because it does not improve polymerization reactivity and makes purification after polymerization difficult to carry out.

The metallocene catalyst component is converted into a neutral alkylated metallocene and acquires a hydrogenation catalytic function when used in combination with an organo lithium compound.

The form of a polymer to be subjected to a hydrogenation reaction is not particularly limited and may be either isolated or in the form of a solution after a polymerization reaction. However, in the former case, the polymer must be dissolved in a solvent again. Therefore, the latter is preferable from an industrial point of view.

(Metathesis Catalyst Component)

The metathesis catalyst component used in the present invention is the compound of the transition metal of the groups 3 to 8 of the periodic table, as exemplified by the halides, oxyhalides, alkoxyhalides, alkoxides, carboxylates, (oxy)acetylacetonates, carbonyl complexes, acetonitrile complexes, hydride complexes of the transition metals and derivatives thereof. Of these, titanium, vanadium, molybdenum, tungsten and rhenium compounds are preferable from the viewpoint of high activity. Specific examples of the metathesis catalyst component include titanium trichloride, titanium tetrachloride, titanium tetrabromide, vanadium tetrachloride, vanadium oxytrichloride, vanadium oxytribromide, tungsten hexachloride, tungsten tetrachloride, tungsten dichloride, tungsten hexabromide, tungsten diiodide, tungsten dioxide, tungsten trioxide, tridecyl ammonium tungstate, molybdenum pentachloride, molybdenum trichloride, molybdenum dibromide, molybdenum diiodide, molybdenum trioxide, molybdenum dioxide, molybdenum (oxy)tetrachloride, tridecyl ammonium molybdate, rhenium trichloride, rhenium (oxy) trichloride, rhenium tribromide and rhenium (oxy) tribromide. Of these, titanium tetrachloride, molybdenum pentachloride and tungsten hexachloride are particularly preferable.

The metathesis catalyst comprises the above metathesis catalyst component and an organic aluminum compound. The organic aluminum compound used in the catalyst is particularly preferably a trialkyl aluminum compound such as triethyl aluminum or triisobutyl aluminum.

Further, an additive may be added to enhance the polymerization activity of the metathesis catalyst.

Illustrative examples of the additive include nitrogen-containing compounds, oxygen-containing compounds, sulfur-containing compounds and halogen-containing compounds, as exemplified by an aliphatic tertiary amines, aromatic tertiary amines, molecular oxygen, water, alcohols, ethers, peroxides, carboxylic acids, acid anhydrides, acid chlorides, esters, ketones, aldehydes, pyridine derivatives, thiophene derivatives and molecular iodine. Of these, aliphatic and aromatic tertiary amines are preferable, and triethylamine, dimethylaniline, tributylamine, pyridine and methylpyridine are particularly preferable because they greatly improve polymerization activity.

The amount of the metathesis polymerization catalyst component is $10^{-5}$ to $10^{-1}$ mole, preferably $10^{-4}$ to $10^{-2}$ mole, per mole of the cyclic olefin in consideration of polymerization activity.

As for the amounts of other components, the amount of the organic aluminum compound is 1 to 100 moles, preferably 2 to 50 moles, per mole of the metathesis catalyst component, and that of the additive is 0.005 to 10 moles, preferably 0.05 to 3 moles. When the amount of the organic aluminum compound is too small, sufficient activity cannot be obtained, while when it is too large, activity does not improve so much and it is rather a great burden on the removal of the catalyst and increases costs disadvantageously. When the amount of the additive is too small, the improvement of polymerization activity is not seen, while when it is too large, the additive deactivates the catalyst disadvantageously.

(Ziegler Catalyst Component)

The Ziegler catalyst component used in the present invention can be classified into two groups according to reaction system. That is, one group comprises Ziegler catalyst components suitable for addition copolymerization and the other comprises Ziegler catalyst components suitable for a hydrogenation reaction.

The Ziegler catalyst components suitable for addition copolymerization include vanadium compounds represented by the following general formulae (XI) and (XII):

  (XI)

  (XII)

wherein $R^{47}$ is an aliphatic hydrocarbon group having 1 to 8 carbon atoms or aromatic hydrocarbon group having 6 to 18 carbon atoms, a, b, c and d are integers which satisfy $0 \leq a \leq 3$, $0 \leq b \leq 3$, $2 \leq a+b \leq 3$, $0 \leq c \leq 4$, $0 \leq d \leq 4$ and $3 \leq c+d \leq 4$.

Specifically, the vanadium compounds include vanadium (oxy)trichloride, vanadium (oxy)(ethoxy)dichloride, vanadium (oxy) (propoxy)dichloride, vanadium (oxy) (isopropoxy)dichloride, vanadium (oxy)(butoxy)dichloride, vanadium (oxy)(isobutoxy)dichloride, vanadium (oxy) (diethoxy)chloride, vanadium (oxy)(diisopropoxy)chloride, vanadium (oxy)(dibutoxy)chloride, vanadium (oxy) (diisobutoxy)chloride, vanadium (oxy)triethoxide, vanadium (oxy)tripropoxide, vanadium (oxy)triisopropoxide, vanadium (oxy)tributoxide, vanadium (oxy)triisobutoxide, vanadium trichloride, vanadium tribromide and vanadium tetrachloride.

The amount of the vanadium compound may be determined according to its polymerization activity. It is used in an amount of $10^{-6}$ to $10^{-2}$ mole, preferably $10^{-5}$ to $10^{-3}$ mole, per mole of the cyclic olefin added to the polymerization reaction system.

The Ziegler catalyst suitable for addition copolymerization is a catalyst produced from a combination of the vanadium compound and an organic aluminum compound. The organic aluminum compound is particularly preferably an organic aluminum halide compound exemplified by diethyl aluminum chloride, diisobutyl aluminum chloride, ethyl aluminum sesquichloride, butyl aluminum sesquichloride, ethyl aluminum dichloride, isobutyl aluminum dichloride and the like.

An electron donor can be further added to the Ziegler catalyst to improve its polymerization activity. Illustrative examples of the electron donor include oxygen-containing electron donors such as alcohols, phenols, ketones, aldehydes, carboxylic acids, acid esters, acid amides, acid anhydrides, ethers and alkoxysilanes, amines, nitrites, isocyanates and the like.

As for the ratio of the organic aluminum compound to the vanadium compound, the organic aluminum compound is used in an amount of 2 to 500 moles, preferably 2 to 50 moles, more preferably 3 to 30 moles, per mole of the vanadium compound. When the amount of the organic aluminum compound is too small, high activity cannot be obtained while when the amount is too large, the polymer may be gelled disadvantageously. As for the ratio of the electron donor to the vanadium compound, the electron donor is used in an amount of 0.005 mole to 10 moles, preferably 0.05 mole to 3 moles, per mole of the vanadium compound. When the amount of the additive is too small, the improvement of polymerization activity is not seen while when the amount is too large, the catalyst is deactivated disadvantageously.

The Ziegler catalyst component suitable for use as a hydrogenation catalyst is preferably a halide, acetyl acetonate complex, carboxylate complex, naphthenate complex, trifluoroacetate complex or stearate complex of a transition metal such as vanadium, chromium, manganese, iron, ruthenium, cobalt, rhodium, nickel or palladium. Specific examples of the Ziegler catalyst component include triethyl vanadate, tris(acetylacetonate)chromium, tris (acetylacetonate)manganese, cobalt acetate, tris (acetylacetonate)cobalt, cobalt octoate, bis(acetylacetonate) nickel and the like. Of these, cobalt and nickel compounds are preferable, and tris (acetylacetonate) cobalt and bis (acetylacetonate) nickel are particularly preferable from the viewpoint of catalytic activity.

The Ziegler catalyst suitable for a hydrogenation reaction is produced from a combination of the above transition metal compound and an organic aluminum compound. The organic aluminum compound used in the catalyst is the same as that described above and is particularly preferably a trialkyl aluminum compound such as triethyl aluminum or triisobutyl aluminum.

As for the quantitative relationship between the transition metal compound and the organic aluminum compound, the amount of the metal component of the alkyl metal compound should be 1 to 50 moles, preferably 1 to 10 moles, per mole of the metal of the transition metal compound.

The form of the polymer to be subjected to a hydrogenation reaction is not particularly limited. It may be either isolated or in the form of a solution after a polymerization reaction. However, in the former case, the polymer must be dissolved in a solvent again. Therefore, the latter is preferable from an industrial point of view.

(Cyclic Olefin)

The cyclic olefin used in the present invention is represented by the following general formula (I):

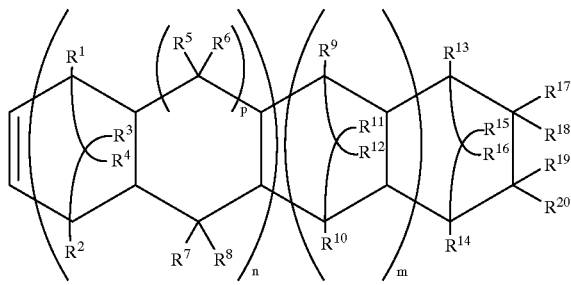

wherein n is 0 or 1, m is 0 or a positive integer, p is 0 or 1, $R^1$ to $R^{20}$ are the same or different and are each a hydrogen atom, halogen atom, aromatic hydrocarbon group having 6 to 10 carbon atoms or saturated or unsaturated aliphatic hydrocarbon group having 1 to 12 carbon atoms, and $R^{17}$ and $R^{18}$, or $R^{19}$ and $R^{20}$ may form an alkylidene group, $R^{17}$ or $R^{18}$, and $R^{19}$ or $R^{20}$ may form a ring, and the ring may have a double bond or aromatic ring.

The following compounds can be enumerated as examples of the cyclic olefin represented by the above formula (I):

bicyclo[2.2.1]hept-2-ene derivatives such as
bicyclo[2.2.1]hept-2-ene(norbornene),
1-methylbicyclo[2.2.1]hept-2-ene,
6-methylbicyclo[2.2.1]hept-2-ene,
6-ethylbicyclo[2.2.1]hept-2-ene,
6-n-propylbicyclo[2.2.1]hept-2-ene,
6-isopropylbicyclo[2.2.1]hept-2-ene,
6-n-butylbicyclo[2.2.1]hept-2-ene,
6-isobutylbicyclo[2.2.1]hept-2-ene,
6-ethylidenebicyclo[2.2.1]hept-2-ene,
6-propylidenebicyclo[2.2.1]hept-2-ene,
6-isopropylidenebicyclo[2.2.1]hept-2-ene and
7-methylbicyclo[2.2.1]hept-2-ene; tricyclo[4.3.0.1$^{2.5}$]-3-decene derivatives such as tricyclo[4.3.0.1$^{2.5}$]-3-decene,
2-methyltricyclo[4.3.0.1$^{2.5}$]-3-decene,
5-methyltricyclo[4.3.0.1$^{2.5}$]-3-decene and
10-methyltricyclo[4.3.0.1$^{2.5}$]-3-decene; dicyclopentadiene;
tricyclo[4.4.0.1$^{2.5}$]-3-undecene derivatives such as
tricyclo[4.4.0.1$^{2.5}$]-3-undecene,
2-methyltricyclo[4.4.0.1$^{2.5}$]-3-undecene,
5-methyltricyclo[4.4.0.1$^{2.5}$]-3-undecene and
11-methyltricyclo[4.4.0.1$^{2.5}$]-3-undecene;
tetracyclo[4.4.0.1$^{2.5}$.1$^{7.10}$]-3-dodecene derivatives such as
tetracyclo[4.4.0.1$^{2.5}$.1$^{7.10}$]-3-dodecene,
8-methyltetracyclo[4.4.0.1$^{2.5}$.1$^{7.10}$]-3-dodecene,
8-ethyltetracyclo[4.4.0.1$^{2.5}$.1$^{7.10}$]-3-dodecene,
8-n-propyltetracyclo[4.4.0.1$^{2.5}$.1$^{7.10}$]-3-dodecene,
8-isopropyltetracyclo[4.4.0.1$^{2.5}$.1$^{7.10}$]-3-dodecene,
8-n-butyltetracyclo[4.4.0.1$^{2.5}$.1$^{7.10}$]-3-dodecene,
8-isobutyltetracyclo[4.4.0.1$^{2.5}$.1$^{7.10}$]-3-dodecene,
8-ethylidenetetracyclo[4.4.0.1$^{2.5}$.1$^{7.10}$]-3-dodecene,
8-n-propylidenetetracyclo[4.4.0.1$^{2.5}$.1$^{7.10}$]-3-dodecene and
8-isopropylidenetetracyclo[4.4.0.1$^{2.5}$.1$^{7.10}$]-3-dodecene;
pentacyclo[6.5.1.1$^{3.6}$.0$^{2.7}$.0$^{9.13}$]-4-pentadecene; and
pentacyclo[6.5.1.1$^{3.6}$.0$^{2.7}$.0$^{9.13}$]-4,10-pentadecadiene.

Of these, bicyclo[2.2.1]hept-2-ene(norbornene) derivatives, dicyclopentadiene and tetracyclo[4.4.0.1$^{2.5}$.1$^{7.10}$]-3-dodecene derivatives are preferable because they are inexpensive and can be synthesized and isolated easily, and norbornene and dicyclopentadiene are particularly preferable. They may be used alone or in combination of two or more.

(Cyclic Olefin Polymer)

The cyclic olefin polymer produced in the present invention is not particularly limited as long as it contains a cyclic olefin as a polymerized unit. Basically, the cyclic olefin polymer can be classified into the group of addition copolymers of cyclic olefins and α-olefins, the group of ring-opened polymers of cyclic olefins or the group of hydrogenated polymers thereof according to polymer structure.

(Addition Copolymer)

In the present invention an α-olefin-cyclic-olefin copolymer is produced by addition copolymerizing an α-olefin having 2 or more carbon atoms and a cyclic olefin in a hydrocarbon solvent in the presence of a polymerization catalyst selected from the group consisting of a metallocene catalyst and a Ziegler catalyst.

The addition copolymer has a recurring structure represented by the following general formula (XIII):

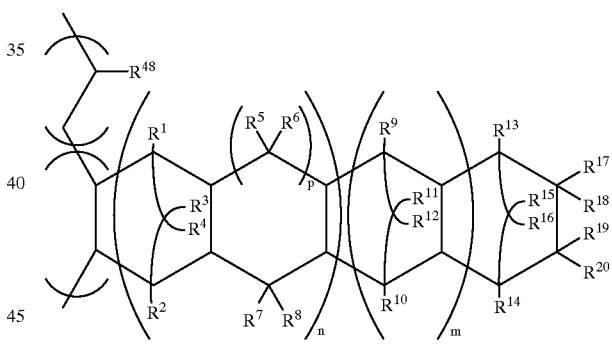

wherein n, m, p and $R^1$ to $R^{20}$ are the same as defined in the formula (I), and $R^{48}$ is a hydrogen atom or hydrocarbon group having 1 to 18 carbon atoms.

The molar ratio of the cyclic olefin component to the a-olefin component is not particularly limited but preferably in the range of 90/10 to 10/90, more preferably 80/20 to 20/80.

Illustrative examples of the α-olefin having 2 or more carbon atoms used in the present invention include α-olefins having 2 to 20 carbon atoms such as ethylene, propylene, 1-butene, 1-pentene, 1-hexene, 4-methyl-1-pentene, 1-heptene, 1-octene and 1-decene. Of these, ethylene and propylene are preferable from the viewpoints of polymerization activity and the molecular weight of the polymer, and ethylene is particularly preferable. They may be used alone or in combination of two or more.

The cyclic olefin, the metallocene catalyst and the Ziegler catalyst are as have already been described above.

Specific examples of the hydrocarbon solvent used herein include aliphatic hydrocarbons such as pentane, hexane, heptane and octane; alicyclic hydrocarbons such as cyclopentane, methyl cyclopentane, cyclohexane, methyl cyclohexane and cyclooctane; and aromatic hydrocarbons such as benzene, toluene, xylene, mesitylene and diethylbenzene. They may be used alone or in combination of two or more. Of these, aromatic hydrocarbons and alicyclic hydrocarbons are preferable because they have high solubility for catalysts and polymers, and benzene, toluene, cyclohexane and methyl cyclohexane are particularly preferable.

The molar ratio of the α-olefin unit to the cyclic olefin unit in the copolymer can be easily controlled by controlling the ratio of the concentrations of both monomers. Particularly when the α-olefin is gaseous at normal temperature like ethylene, the introduction ratio into the polymer can be controlled by the pressure of the α-olefin.

The temperature and time of a polymerization reaction may be determined according to the types of monomers and catalyst used in addition copolymerization. Generally speaking, the temperature is 0 to 100° C., preferably 10 to 80° C., and the reaction time is 0.1 to 10 hours.

(Hydrogenated Polymer of Addition Copolymer)

When a cyclic olefin having two or more double bonds between carbons is used to produce the above addition copolymer, the double bonds between carbons remain in the addition copolymer. In this case, a hydrogenated polymer can be produced by adding a hydrogenation catalyst selected from the group consisting of a metallocene catalyst and a Ziegler catalyst to a reaction solution obtained after polymerization to carry out hydrogenation. The hydrogenated polymer has a recurring structure represented by the following general formula (XIV):

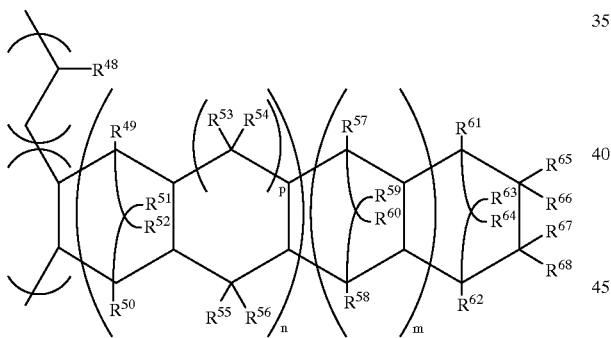

(XIV)

wherein n, m and p are the same as defined in the formula (I), and $R^{49}$ to $R^{68}$ are the same or different and are each a hydrogen atom, halogen atom, aromatic hydrocarbon group having 6 to 10 carbon atoms or saturated aliphatic hydrocarbon group having 1 to 12 carbon atoms, with the proviso that $R^{65}$ or $R^{66}$ and $R^{67}$ or $R^{68}$ may form a ring and the ring may have an aromatic ring.

Illustrative examples of the cyclic olefin having two or more double bonds between carbons include bicyclo[2.2.1]hept-2-ene derivatives such as 6-ethylidenebicyclo[2.2.1]hept-2-ene, 6-propylidenebicyclo[2.2.1]hept-2-ene and 6-isopropylidenebicyclo[2.2.1]hept-2-ene; dicyclopentadiene; tetracyclo[4.4.0.1$^{2.5}$.1$^{7.10}$]-3-dodecene derivatives such as 8-ethylidenetetracyclo[4.4.0.1$^{2.5}$.1$^{7.10}$]-3-dodecene, 8-n-propylidenetetracyclo[4.4.0.1$^{2.5}$.1$^{7.10}$]-3-dodecene and 8-isopropylidenetetracyclo[4.4.0.1$^{2.5}$.1$^{7.10}$]-3-dodecene; and pentacyclo[6.5.1.1$^{3.6}$.0$^{2.7}$.0$^{9.13}$]-4,10-pentadecadiene. Of these, dicyclopentadiene is preferable because it is inexpensive and easy to acquire.

The metallocene catalyst and the Ziegler catalyst used as a hydrogenation catalyst are as have already been described above.

In the present invention, the solution obtained after a polymerization reaction is used in the hydrogenation reaction. Even if the solvent is an aromatic hydrocarbon, only the polymer can be selectively hydrogenated.

The temperature, hydrogen pressure and reaction time of the hydrogenation reaction of the addition copolymer may be determined according to the types of monomers and hydrogenation catalyst used in addition copolymerization. Generally speaking, the temperature is 0 to 200° C., preferably 20 to 180° C., the hydrogen pressure is 0.1 to 200 kgf/cm², preferably 1 to 100 kgf/cm², and the reaction time is 0.1 to 10 hours.

The degree of hydrogenation of the copolymer (hydrogenation rate of the double bonds between carbons) is 98% or more, preferably 99% or more, more preferably 99.5% or more. When the degree of hydrogenation is lower than 98%, thermal stability becomes insufficient and discoloration readily occurs at the time of melt molding disadvantageously.

(Ring-opened Polymer)

In the present invention, a cyclic olefin ring-opened polymer is produced by ring-opening polymerizing a cyclic olefin in a hydrocarbon solvent in the presence of a metathesis catalyst.

The cyclic olefin ring-opened polymer produced in the present invention is a polymer having the double bonds between carbons opened in the norbornene skeleton of a cyclic olefin and has a recurring structure represented by the following general formula (XV):

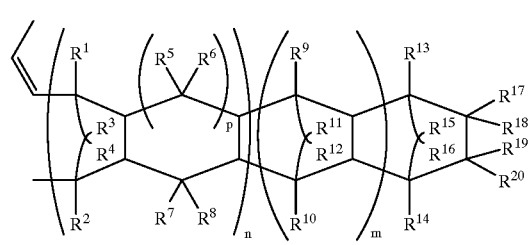

(XV)

wherein n, m, p and $R^1$ to $R^{20}$ are the same as defined in the formula (I).

The cyclic olefin, the metathesis catalyst and the ring-opened polymer are as have already been described above. The hydrocarbon solvent used herein is the same as that used in the addition copolymerization reaction.

The temperature and time of the polymerization reaction may be determined according to the types of monomers and catalyst used in the ring-opening polymerization. Generally speaking, the temperature is 0 to 150° C., preferably 10 to 100° C., and the reaction time is 0.1 to 10 hours.

(Hydrogenated Polymer of Ring-opened Polymer)

In the present invention, since the ring-opened polymer produced by a ring-opening polymerization reaction inevitably contains double bonds between carbons, a hydrogenation catalyst selected from the group consisting of a metallocene catalyst and a Ziegler catalyst is added to the solution obtained after ring-opening polymerization in carrying out hydrogenation.

The hydrogenated polymer has a recurring structure represented by the following general formula (XVI):

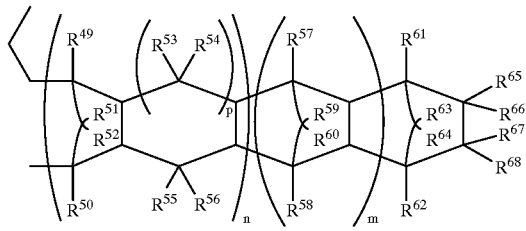

(XVI)

wherein n, m and p are the same as defined in the above formula (I), and $R^{49}$ to $R^{68}$ are the same or different and are each a hydrogen atom, halogen atom, aromatic hydrocarbon group having 6 to 10 carbon atoms or saturated aliphatic hydrocarbon group having 1 to 12 carbon atoms, with the proviso that $R^{65}$ or $R^{66}$ and $R^{67}$ or $R^{68}$ may form a ring and the ring may have an aromatic ring.

The metallocene catalyst and Ziegler catalyst suitable for use as a hydrogenation catalyst are as have already been described above. The conditions of the hydrogenation reaction are exactly the same as those of a hydrogenation reaction following an addition copolymerization reaction.

(Removal of Catalyst)

In the present invention, at least one compound selected from the group consisting of an α-oxyacid and β-oxyacid having one hydroxyl group and one carboxyl group in the molecule and derivatives obtained by substituting the hydroxyl group thereof by an alkoxyl group is added to the solution of a reaction product after the production of a cyclic olefin polymer to decompose and inactivate the catalyst and to precipitate a catalyst metal component.

The compound selected from the group consisting of the α-oxyacid, β-oxyacid and derivatives thereof in which OH group is substituted by alkoxyl group is represented by the following general formula (II):

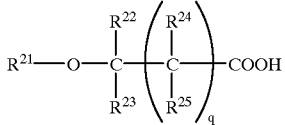

(II)

wherein q is 0 or 1, $R^{21}$ is a hydrogen atom or alkyl group having 1 to 5 carbon atoms, and $R^{22}$, $R^{23}$, $R^{24}$ and $R^{25}$ are the same or different and are each a hydrogen atom, alkyl group having 1 to 6 carbon atoms, phenyl group or benzyl group.

Preferable examples of the compound represented by the above formula (II) include glycolic acid, lactic acid, 2-hydroxybutyric acid, 3-hydroxybutyric acid, 2-hydroxy-2-methylpropionic acid, 2-hydroxy-2-methylbutyric acid, 2-hydroxy-3-methylbutyric acid, 3-hydroxy-2,2-dimethyllactic acid, mandelic acid, diphenylglycolic acid, tropic acid, 3-hydroxy-3-phenylpropionic acid, methoxyacetic acid, 2-methoxypropionic acid, 3-methoxypropionic acid and α-methoxyphenylacetic acid.

Of these, glycolic acid, lactic acid, 2-hydroxybutyric acid, 3-hydroxybutyric acid, 2-hydroxy-2-methylpropionic acid, methoxyacetic acid, 2-methoxypropionic acid and 3-methoxypropionic acid are preferable because the boiling point is about 200° C. or less at 10 mmHg and they can be easily removed in the step of distilling off the solvent. Further, α-oxyacids are more preferable because they have a great chelating effect and render a metal component insoluble with ease, and glycolic acid, lactic acid, 2-hydroxybutyric acid and 2-hydroxy-2-methylpropionic acid are particularly preferable.

The amount of the compound represented by the above formula (II) is preferably determined by the total amount of catalyst metals contained in the reaction system. That is, the compound is preferably added in an amount of 0.1 to 5 moles based on 1 equivalent of the total of the product of the number of moles of the transition metal catalyst component and the oxidation number of the transition metal and the product of the number of moles of the organic aluminum compound and the oxidation number of aluminum (3), and the product of the number of moles of the organo lithium compound and the oxidation number of lithium (1) as required.

It is also preferable to add a compound selected from the group consisting of water and alcohols in addition to the compound represented by the above formula (II). The amount of water is 0 to 9.9 moles, preferably 0 to 8 moles, based on the above standard while that of an alcohol is 0 to 5 moles, preferably 0 to 4 moles, based on the same standard. The compound represented by the above formula (II), water and alcohol are preferably added in a total amount of 0.1 to 10 moles.

When the total amount of the compound represented by the above formula (II), water and alcohol is below the above range, the precipitation of the catalyst components becomes incomplete disadvantageously. When the total amount is above the range, on the other hand, the polarity of a polymer solution increases and part or all of the catalyst components remain dissolved in the polymer solution by being trapped by the compound represented by the above formula (II), water and alcohol dissolved therein, disadvantageously. As a matter of course, when the total amount of the compound represented by the above formula (II), water and alcohol is larger than required, the compound deviates far from its solubility in the polymer solution. Therefore, the compound must be separated before filtered. In that case, a waste solution containing metals in large quantities is generated disadvantageously.

Water used in the present intention not only reacts with a catalyst or catalytic activation species to render the catalyst and the catalytic activation species insoluble but also promotes the ionization of oxycarboxylic acid to greatly improve its reactivity.

The alcohol used in the present invention is an aliphatic alcohol having 1 to 5 carbon atoms. Illustrative examples of the aliphatic alcohol include methanol, ethanol, propanol, isopropanol, n-butanol and isobutanol. Polyhydric alcohols such as ethylene glycol, propylene glycol and glycerine are preferably used. Of these, ethylene glycol is particularly preferable because it is inexpensive and renders catalyst metals insoluble due to its polar effect that at least part of another hydroxyl group remains even if it reacts with a catalyst metal to form an alcoholate. The active hydrogen-containing compound is preferably a compound which has a boiling point greatly different from that of the solvent used and can be easily separated and purified in consideration of the step of recovering the solvent.

The compound represented by the above formula (II), water and alcohol may be added independently, or two or more of them may be added simultaneously.

The addition of the compound represented by the above formula (II), water and alcohol to the polymer solution is carried out at 0 to 200° C., preferably 10 to 180° C., more preferably normal temperature to the boiling point of the solvent. When the reaction temperature is below the above range, the reaction does not fully proceed while when the temperature is above the range, a precipitate is apt to dissolve in the polymer solution disadvantageously.

The reaction time is one minute to 10 hours, preferably five minutes to five hours, more preferably 10 minutes to three hours. When the reaction time is shorter than the above range, the reaction does not fully proceed disadvantageously. When the reaction time is longer than the above range, there is no effect and it is only a waste of time.

When an active hydrogen-containing compound is added to the polymer solution, the metallocene catalyst and hydrogenation catalyst form bonds with the compound represented by the above formula (II), water and alcohol. What will be described in detail as an example is a case where after an α-olefin-cyclic olefin is polymerized using isopropylidene(9-fluorenyl) (cyclopentadienyl)zirconium dichloride as metallocene, trityltetra(pentafluorophenyl) borate as a co-catalyst and triisobutyl aluminum as an alkylating agent, the catalysts are removed using a lactic acid/water system as an active hydrogen compound. What will also be described in detail as an example is a case where after tris(acetylacetonate)cobalt is hydrogenated using triisobutyl aluminum as an alkylating agent, the catalyst is removed using a lactic acid/water system as an active hydrogen compound.

(Removal of Polymerization Catalyst)

It is considered that the reaction product of a reaction between the zirconium of the metallocene and lactic acid/water $[Zr(OLc)_m(OH)_{4-m}$: OLc represents the residual lactic acid group and m is an integer of 0 to 4], a derivative from an isopropylidene(9-fluorenyl)(cyclopentadienyl) group which is a ligand, a hydrogen halide and the partial reaction product of a reaction between the metallocene and lactic acid and/or water are formed from the polymerization catalyst. A triphenylmethyl compound containing triphenyl methane is formed from the cationic component of trityltetra (pentafluorophenyl)borate which is a co-catalyst, while boric acid $[HB(C_6F_5)_4]$ is formed from the anionic component. An alkane and $Al(OLc)_n(OH)_{3-n}$ [OLc is the same as above and n is an integer of 0 to 3] and/or a condensate thereof are formed from triisobutyl aluminum. Generally speaking, the gelation of the condensate is promoted as its degree of condensation increases.

Of these, a decomposition product containing zirconium, decomposition product containing aluminum, hydrogen halide, boric acid and the like are highly inorganic and separate out from a hydrocarbon-based polymer solution having a low polarity. Since the decomposition product of the metallocene and boric acid are extremely small in quantity, it is difficult to isolate and precipitate each of them nearly completely. However, as they are embraced in a decomposition product derived from triisobutyl aluminum which is existent in large quantity, it is possible to separate them from a polymer solution very efficiently. A triisobutyl aluminum compound is particularly preferable because it is apt to become a decomposition product having a high degree of condensation and, therefore, easily includes the metallocene decomposition product and boric acid.

(Removal of Hydrogenation Catalyst)

Tris(acetylacetonate)cobalt, which is one of typical Ziegler-based hydrogenation catalysts, has no hydrogenation catalytic function itself and exhibits a catalytic function as active species when it is reduced by triisobutyl aluminum and becomes a compound containing an isobutyl group. Because the compound is alkylated, it extremely readily reacts with the active hydrogen-containing compound used in the present invention and becomes a decomposition product insoluble in a hydrocarbon-based polymer solvent. The decomposition product is precipitated together with a decomposition product derived from triisobutyl aluminum or by being embraced in the decomposition product as described above. However, since a hydrogenation reaction is carried out at high temperatures, an acetylacetonate group is exchanged between tris(acetylacetonate)cobalt and triisobutyl aluminum, whereby tris(acetylacetonate) aluminum is by-produced. This compound itself is very stable and cannot be decomposed by water, alcohols or ordinary carboxylic acid. In addition, since the acetylacetonate group covers aluminum which is the central metal and the methyl group is aligned outward, the compound has a low polarity, dissolves in a non-polar hydrocarbon solvent and is not easily adsorbed to and included in a decomposition product derived from triisobutyl aluminum having a high polarity. However, since lactic acid is a stronger chelating agent than acetylacetone, it provides a compound having a higher polarity [for example, $Al(OLc)_3$: Lc is the same as above] by exchanging a chelate even with tris(acetylacetonate) aluminum. Therefore, the by-product can be precipitated and separated efficiently.

At least some of organic substances (a derivative from the above isopropylidene(9-fluorenyl)(cyclopentadienyl) group, an organic substance derived from a ligand such as acetylacetone, alkane, triphenylmethane derived from a trityl group, and an excess of an active hydrogen compound) which are components other than metal components and inorganic substances remain in a polymer solution. However, they can be removed when the solvent and the residual cyclic olefin or a hydrogenated compound thereof are removed.

The precipitated catalyst metal residue can be removed from the polymer solution by filtration or a commonly used method such as centrifugation.

In the present invention, to remove the catalyst metal residue and a discoloring component to the highly extent and more efficiently, the active hydrogen compound is added to cause a decomposition reaction and then, a reaction solution can be treated with an adsorbent. The adsorbent is not particularly limited but it is preferably acidic clay, active clay, activated carbon, diatomaceous earth, silica gel, alumina, silica alumina gel, zeolite or the like. The treatment method may be one comprising the steps of adding an adsorbent to a polymer solution, stirring the resulting polymer solution to be mixed and removing a catalyst by filtration or the like or one comprising the step of forcing a polymer solution to pass through the packed phase (packed column) of an adsorbent. Since metal components derived from the polymer solution are almost completely removed in the previous stage, the amount of the adsorbent is very small in the former method while the number of times of exchanging the packed phase and regenerating it are small in the latter method. The method comprising the step of forcing the polymer solution to pass through the packed phase of the adsorbent is industrially advantageous.

When the polymer solution is washed with an aqueous solution, an acidic, neutral or basic aqueous solution may be used. Of these, one aqueous solution may be used or two or more different aqueous solutions may be used stepwise. In this case, although a waste washing solution is produced, the disposal of the waste solution causes no problem because metal components derived from the polymer solution have been almost completely removed in the previous stage.

The total amount of a transition metal, aluminum and lithium contained in the cyclic olefin polymer thus obtained is preferably 5 ppm or less, more preferably 3 ppm or less, particularly preferably 2 ppm or less. The amount of the transition metal is preferably 2 ppm or less, particularly preferably 1 ppm or less. The amount of aluminum is preferably 3 ppm or less, particularly preferably 1 ppm or less.

(Recovery of Polymer)

A polymer is recovered by a solvent removal step from the polymer solution from which the catalyst metal residue has been removed by the above process. The solvent is removed by a heating vacuum condenser, vented extruder and the like. The polymer can also be recovered by injecting the polymer solution into an ordinary poor solvent and precipitating and separating the polymer.

Various additives such as an antioxidant may be added to the cyclic olefin polymer obtained by the present invention as required. Illustrative examples of the antioxidant include 2,6-di-t-butyl-4-methylphenol, 2,2'-dioxy-3,3'-di-t-butyl-5, 5'-dimethyldiphenyl methane, tetrakis[2-(3,5-di-t-butyl-4-hydroxyphenyl)ethylpropionate]methane, pentaerythrityl-tetrakis[3-(3,5-di-t-butyl-4-hydroxyphenyl)propionate], tris (2,4-di-t-butylphenyl)phosphite, bis-(2,6-di-t-butyl-4-methylphenyl)-pentaerythritol diphosphite and the like.

Since the cyclic olefin polymer obtained by the present invention contains substantially no polymerization catalyst residue and has a very high purity, it has excellent properties such as transparency, heat resistance, light resistance, dielectric characteristics and mechanical characteristics and can be advantageously used as an optical material for optical disk substrates and camera lenses.

That is, according to the present invention, there are provided a cyclic olefin polymer having a total content of a transition metal, aluminum and lithium of 5 ppm or less, a cyclic olefin polymer having an aluminum content of 3 ppm or less, and use of these polymers as an optical material.

According to the present intention, a copolymer having an extremely high purity can be obtained by removing the catalyst residue very efficiently from a cyclic olefin polymer solution obtained using a metallocene catalyst or a hydrogenated cyclic olefin copolymer solution obtained using a homogeneous hydrogenation solvent by a simple method which does not generate a waste solution containing metals.

EXAMPLES

The following examples are provided for the purpose of further illustrating the present invention but are in no way to be taken as limiting.

The following examples were carried out in an inert atmosphere such as argon or nitrogen unless otherwise stated. Toluene (solvent), dicyclopentadiene, norbornene, 8-ethylidenetetracyclo[4.4.0.1$^{2,5}$.1$^{7,10}$]-3-dodecene and triethylamine were used that were purified by distillation and thoroughly dried by a commonly used method.

Isopropylidene(9-fluorenyl)(cyclopentadienyl) zirconium dichloride was purchased from Boulder Scientific Co., Ltd. as a metallocene and used without further purification.

Trityl-tetrakis(pentafluorophenyl)borate was purchased from Toso Akzo Co., Ltd. as an ionic boron compound and used without further purification.

Triisobutyl aluminum was purchased from Toso Akzo Co., Ltd. as a 2-M toluene solution and used without further purification.

Tris(acetylacetonate)cobalt, titanium tetrachloride, a lactic acid aqueous solution and 2-hydroxy-2-methylpropionic acid were purchased from Wako Pure Chemical Industries, Ltd. and used without further purification.

Measurement items in the examples were measured in accordance with the following methods. glass transition temperature (Tg(° C.)): measured using the 2920 DSC of TA Instruments Co., Ltd. at a temperature elevation rate of 20° C./min. molecular weight: The reduced viscosity $\eta_{sp}/c$ (dl/g) at 30° C. in a toluene solution having a concentration of 0.5 g/dl is measured. degree of hydrogenation: determined by $^1$H-NMR using the JNM-A-400 nuclear magnetic resonance absorber of JEOL Ltd. concentration of residual metals in polymer: determined by ICP emission spectral analysis. infrared absorption spectrum: measured by KBr method using the 1760X spectroscope of Perkin Elmer Co., Ltd. ultraviolet visible absorption spectrum: measured using the U-320 spectroscope of Hitachi, Ltd., and a 1-cm cell. Toluene was injected into a compensating cell. solid $^{13}$C-NMR spectrum: measured using the DSX300WB of Bruker Co., Ltd.

In the following examples and comparative examples, the number of moles of a compound represented by the formula (II), the number of moles of water and the number of moles of an alcohol added based on 1 equivalent of the total of the product of the number of moles of a transition metal component and the oxidation number of the transition metal and the product of an organic aluminum compound and the oxidation number of aluminum (3), and the product of the number of moles of an organolithium compound and the oxidation number of lithium (1) as required are defined as $f_1$, $f_2$ and $f_3$, respectively.

Reference Example 1

Figure 2:
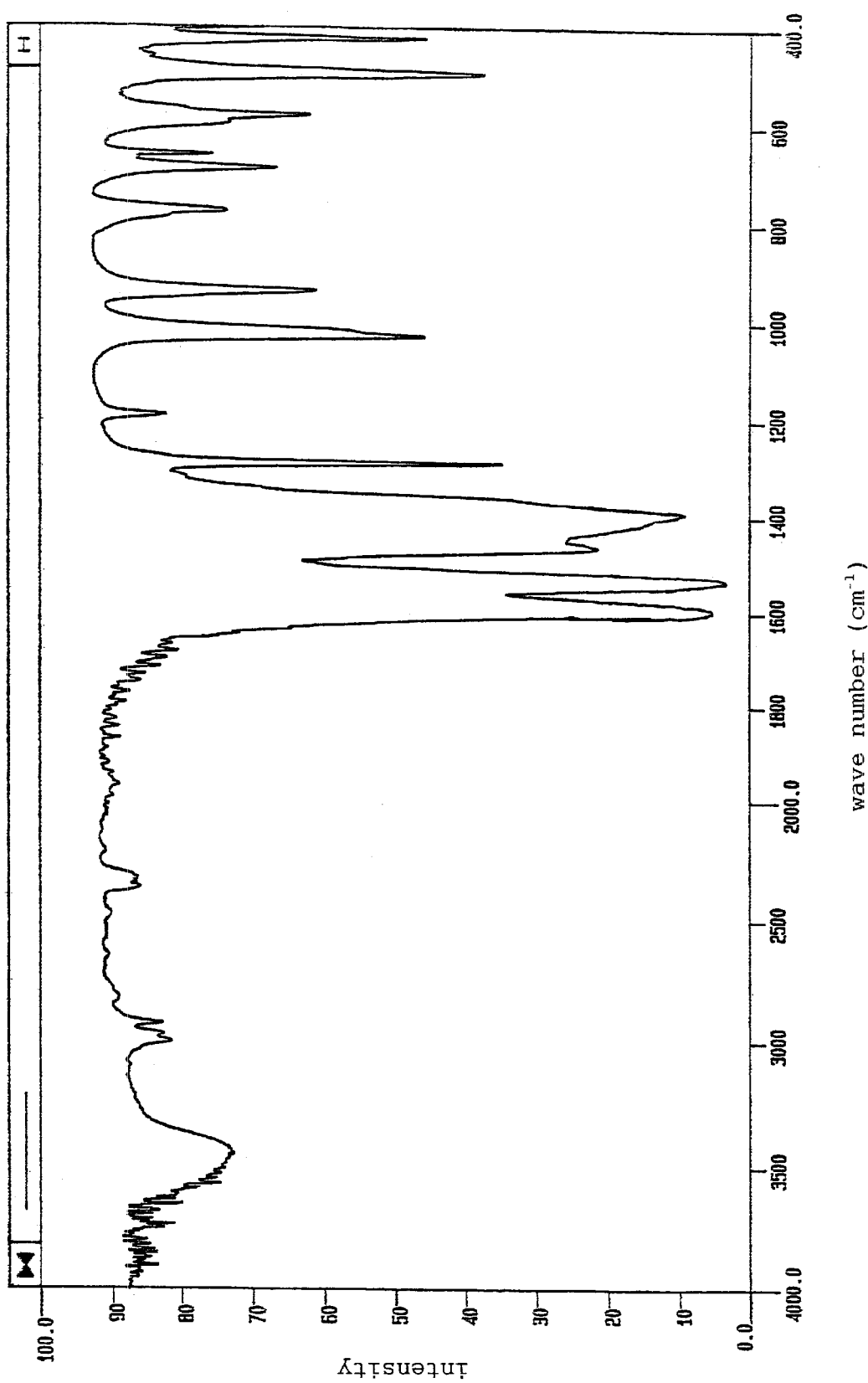
FIG. 2 shows the infrared absorption spectrum of tris (acetylacetonate)aluminum.
Figure 3:
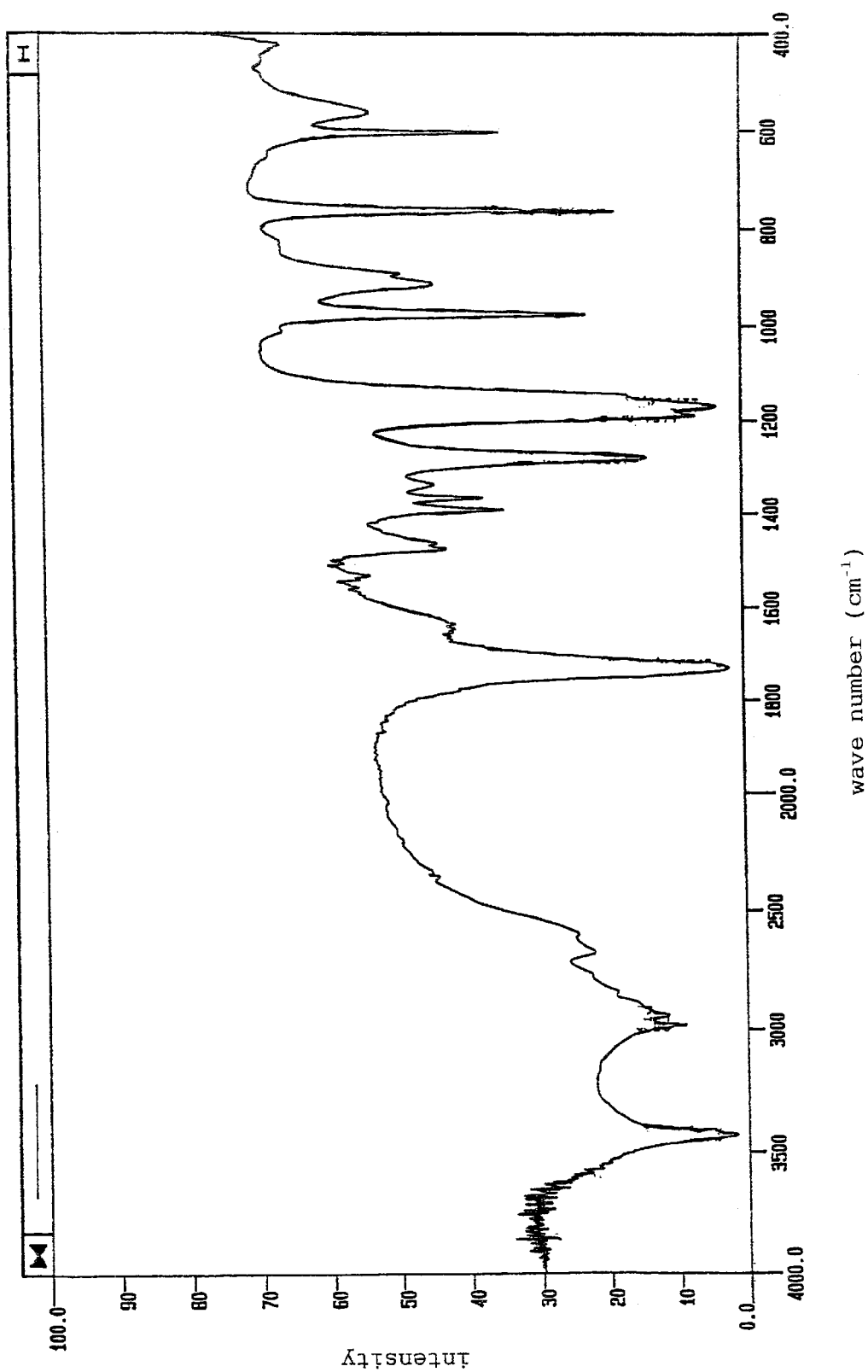
FIG. 3 shows the infrared absorption spectrum of 2-hydroxy-2-methylpropionic acid.

There was dissolved 0.97 g of tris(acetylacetonate) aluminum in 300 g of toluene. The obtained solution was heated to 100° C. and 0.62 g ($f_1$=2.0) of 2-hydroxy-2-methylpropionic acid was added under agitation. Thereafter, the solution was stirred while heated at the same temperature for 2 hours. The formed precipitate was separated by filtration to obtain 1.0 g of an achromatic solid powder. The infrared absorption spectrum of this powder (FIG. 1) was compared with those of tris(acetylacetonate)aluminum (FIG. 2) and 2-hydroxy-2-methylpropionic acid (FIG. 3), which were raw materials. As is obvious from these figures, a strong peak at around 1,540 cm$^{-1}$ derived from tris (acetylacetonate)aluminum and a strong peak at around 1,730 cm$^{-1}$ derived from 2-hydroxy-2-methylpropionic acid disappeared from the spectrum of the powder and a strong peak based on the carbonyl group of aluminum bonded to 2-hydroxy-2-methylpropinic acid was observed at around 1,620 cm$^{-1}$. It was found from above that tris (acetylacetonate)aluminum was changed into the 2-hydroxy-2-methylpropionate of aluminum.

Figure 4:
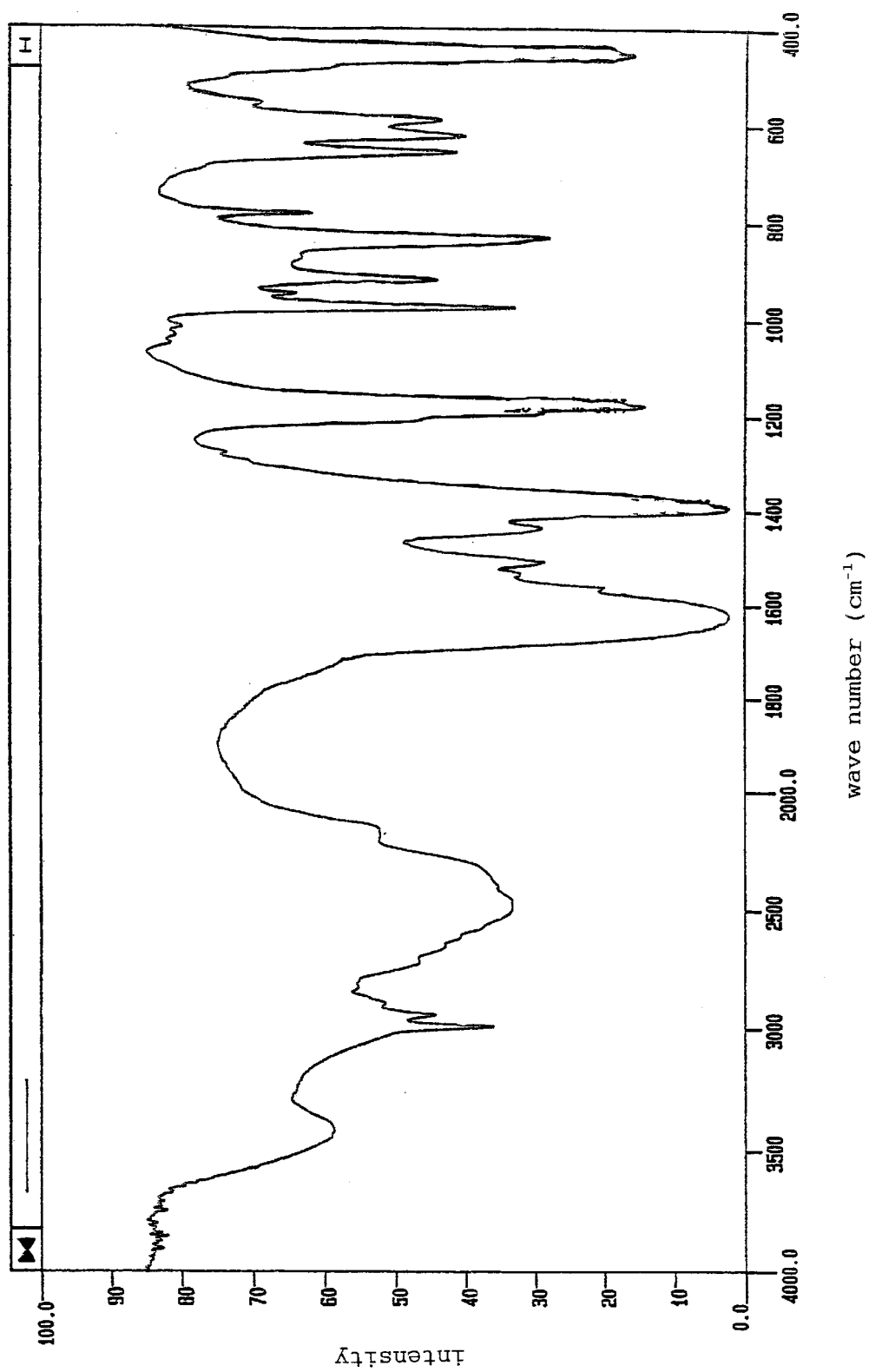
FIG. 4 shows the infrared absorption spectrum of another achromatic solid obtained in Reference Example 1.

A precipitate was also obtained when the same experiment was carried out by adding 0.3 g of water in addition to the 2-hydroxy-2-methylpropionic acid used above. The infrared absorption spectrum of the precipitate (FIG. 4) was the same as that of the above precipitate (FIG. 1).

The same experiment was carried out by adding 1.3 g of ethylene glycol in place of the 2-hydroxy-2-methylpropionic acid used above. However, the deposition of a precipitate was not observed at all.

The same experiment was carried out by adding 0.4 g of acetic acid in place of the 2-hydroxy-2-methylpropionic acid used above. However, the deposition of a precipitate was not observed at all.

Reference Example 2

Figure 5:
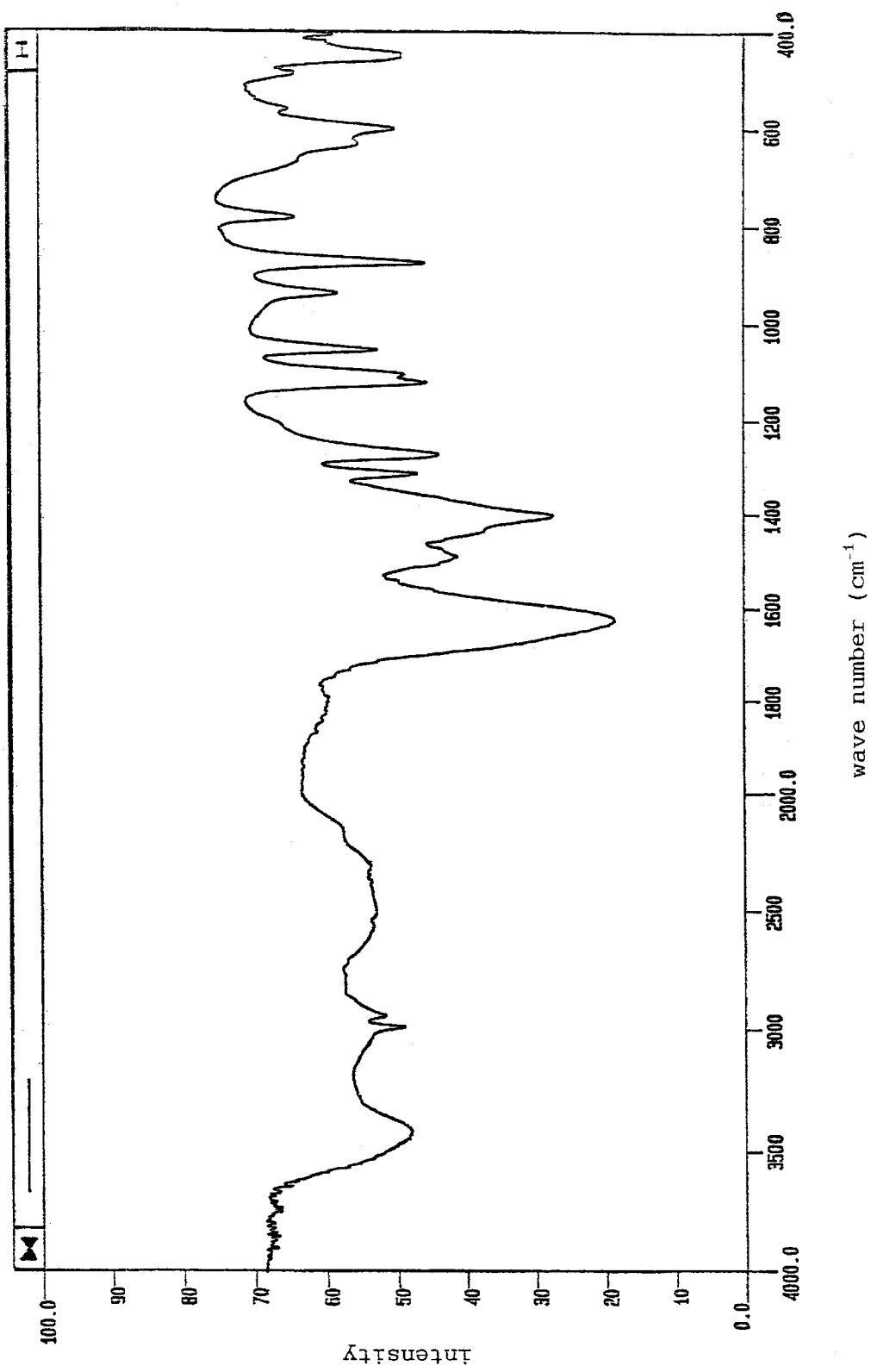
FIG. 5 shows the infrared absorption spectrum of an achromatic solid obtained in Reference Example 2.

There was dissolved 1.3 g of tris(acetylacetonate) aluminum in 300 g of toluene. The obtained solution was heated to 100° C. and 8.4 g of an aqueous solution containing 90 wt % of lactic acid was added dropwise to the solution under agitation. Thereafter, the solution was stirred while heated at the same temperature for 2 hours. The formed precipitate was separated by filtration to obtain 0.8 g of an achromatic solid powder. The infrared absorption spectrum of this powder (FIG. 5) was compared with that of tris (acetylacetonate)aluminum (FIG. 2) which was a raw material. As is obvious from these figures, while a strong peak at around 1,540 cm$^{-1}$ derived from the raw material disappeared from the spectrum of the powder, a strong peak based on the carbonyl group of aluminum lactate was observed at around 1,620 cm$^{-1}$ instead. The infrared absorption spectrum of the powder almost agreed with that of aluminum lactate. Peaks based on the groups $CH_3$, >CH— and —COO— of aluminum lactate were observed at around 23 ppm, 63 ppm and 180 ppm in the spectrum measured by solid $^{13}$C-NMR of the powder, respectively. It was found from above that tris(acetylacetonate)aluminum was changed into an aluminum lactate.

The same experiment was carried out by adding 1.3 g of ethylene glycol in place of the lactic acid aqueous solution used above. However, the deposition of a precipitate was not observed at all.

The same experiment was carried out by adding 0.4 g of acetic acid in place of the lactic acid aqueous solution used above. However, the deposition of a precipitate was not observed at all.

Reference Example 3

Figure 6:
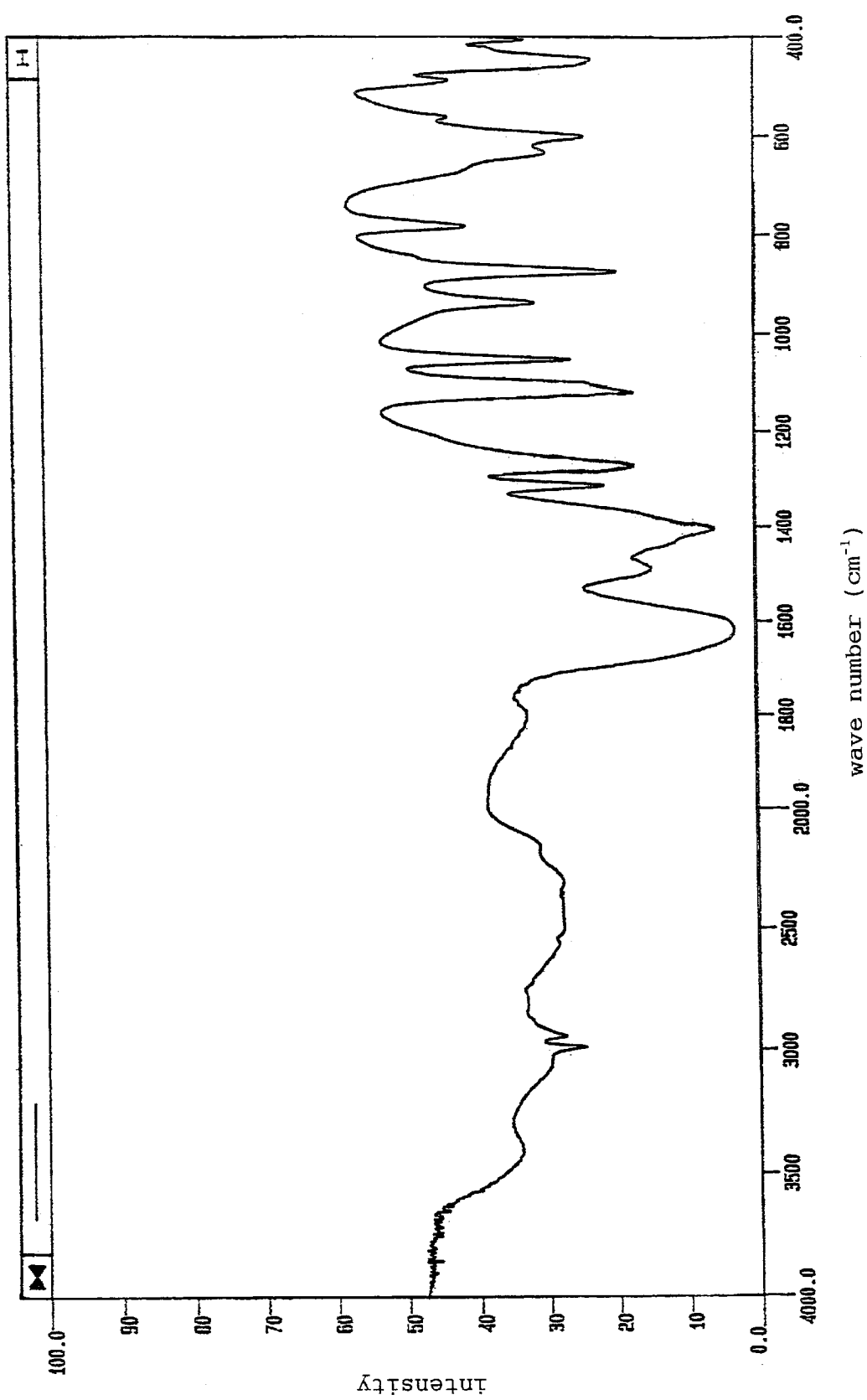
FIG. 6 shows the infrared absorption spectrum of an achromatic solid obtained in Reference Example 2.
Figure 7:
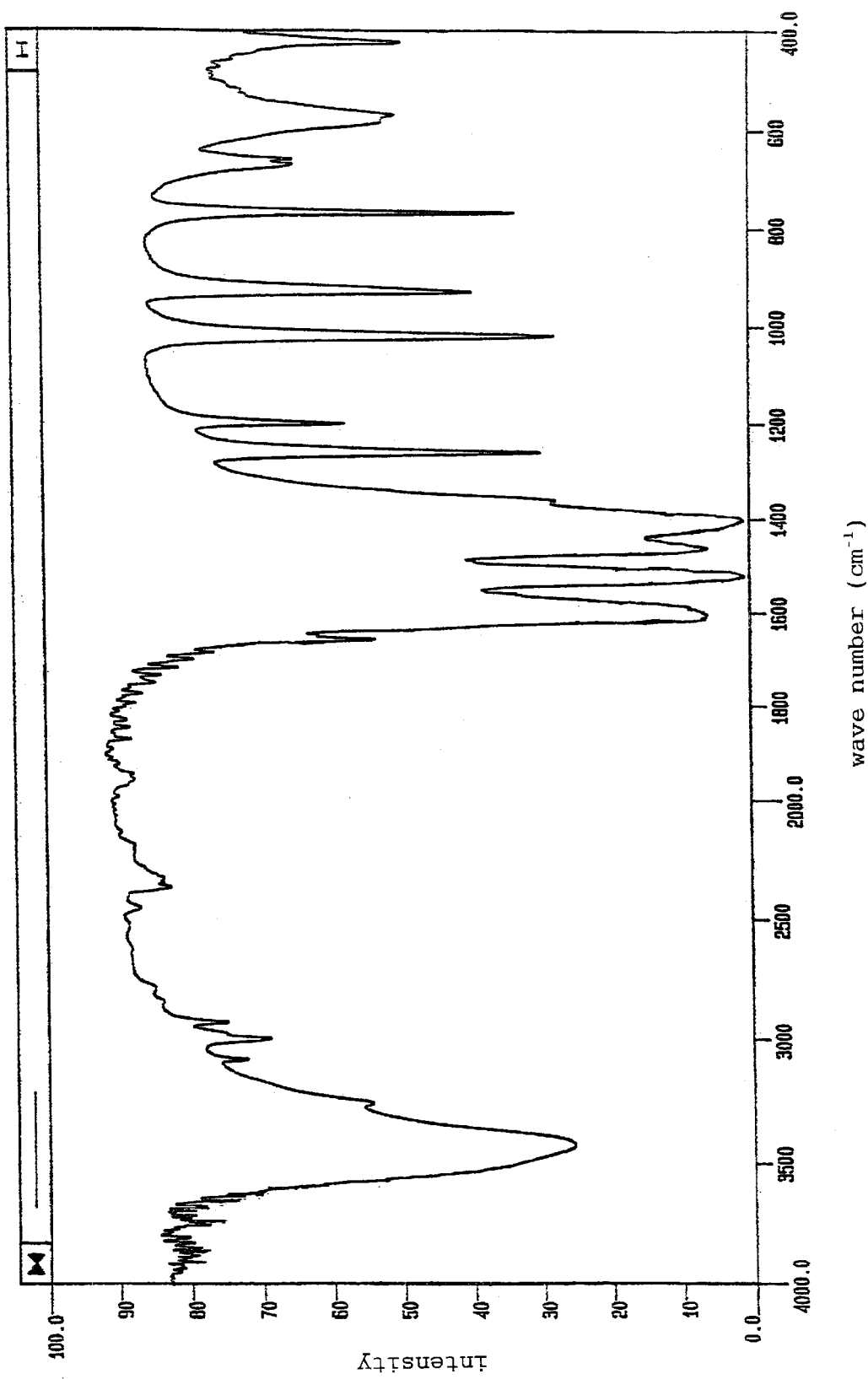
FIG. 7 shows the infrared absorption spectrum of tris (acetylacetonate)cobalt.

There was dissolved 0.8 g of triisobutyl aluminum in 300 g of toluene. Subsequently, 0.30 g of tris (acetylacetylacetonate)cobalt was added to prepare a hydrogenation catalyst. The obtained solution was heated to 100° C. and 8.4 g of an aqueous solution containing 90 wt % of lactic acid was added dropwise to the solution under agitation. Thereafter, the solution was stirred while heated at the same temperature for 2 hours. The formed precipitate was separated by filtration to obtain 1.9 g of a light pink solid powder. The infrared absorption spectrum of this powder (FIG. 6) was compared with the spectrum of tris (acetylacetonate)aluminum (FIG. 2) and the spectrum of tris(acetylacetylacetonate)cobalt (FIG. 7) which were raw materials. As is obvious from these figures, while a peak at around 1,540 cm$^{-1}$ derived from tris(acetylacetonate) aluminum and a peak at around 1,520 cm$^{-1}$ derived from tris(acetylacetylacetonate)cobalt disappeared from the spectrum of the powder, a peak based on aluminum lactate was observed at around 1,620 cm$^{-1}$ instead.

Reference Example 4

There were injected 186 g of dicyclopentadiene, 1,320 g of toluene and 3.6 g of triisobutyl aluminum into a 3-liter stainless steel reactor. The inside of the reactor was substituted with ethylene having normal pressure, 119 mg of isoprene(9-fluorenyl)(cyclopentadienyl)zirconium dichloride and 252 mg of trityl-tetrakis(pentafluoroborate) were added to carry out polymerization at 30° C. During the polymerization, ethylene having normal pressure was supplied continuously, and 163 g of dicyclopentadiene was added at such a speed that the addition rate of dicyclopentadiene and the consumption rate of ethylene were to be 42:58. The supply of ethylene was stopped when the consumption of ethylene reached a molar amount corresponding to 350 g of dicyclopentadiene added (150 minutes), thereby terminating the reaction.

A polymer obtained by dispensing a small amount of the obtained solution and purifying it in accordance with a commonly used method had a reduced viscosity ($\eta_{sp}/c$), measured at 30° C. in a 0.5% toluene solution, of 0.58 dl/g and a Tg, measured by DSC, of 155° C.

The obtained reaction solution (reaction solution a) was supplied into a 10-liter autoclave by pressure and 3.0 g of tris(acetylacetylacetonate)cobalt and 4.8 g of triisobutyl aluminum were added to the reaction solution. Thereafter, a hydrogenation reaction was carried out at a hydrogen pressure of 45 atm. for 120 minutes to obtain a reaction solution b. A small amount of the reaction solution was dispensed and precipitated in a large amount of methanol to prepare a measurement sample. It was found from the $^1$H-NMR spectrum of the sample that this polymer had a hydrogenation rate of 99.9% or more. The reduced viscosity ($\eta_{sp}/c$), measured at 30° C. in a 0.5% toluene solution, of the polymer was 0.45 dl/g. The Tg, measured by DSC, of the polymer was 151° C.

Example 1

There was added 32.0 g of 2-hydroxy-2-methylpropionic acid ($f_1$=2.0) to the reaction solution b obtained in Reference Example 4 (defined as reaction solution 1-1 for discrimination) at 100° C. under agitation to carry out a reaction at the same temperature for 2 hours. The black brown reaction solution changed into a pink turbid slurry. The slurry was then filtered with a cylindrical filter having a diameter of 11 cm. The filter used was prepared by placing Celite on Naslon NF-05 to a thickness of 5 cm and a flannel fabric over the Celite. Filtration pressure was 4 kg/cm$^2$ (gauge pressure). Filtration proceeded very smoothly. The obtained filtrate was adsorbed to basic alumina to obtain an achromatic treated solution. The residual metals of the solution were measured by ICP emission spectral analysis. As a result, the amount of Zr was 0.1 ppm or less, that of B was 0.2 ppm or less, that of Co was 0.4 ppm or less and that of Al was 0.8 ppm based on the polymer. It was found from this that the polymer had very high purity. The unreacted product and the solvent were distilled off (flushed) from the treated solution to obtain an achromatic polymer. According to the ultraviolet visible absorption spectrum of a toluene solution containing 20 wt % of the obtained polymer, the solution had a transmittance at 500 nm of 99% or more.

Example 2

There were added 32.0 g of 2-hydroxy-2-methylpropionic acid and 2.8 g of water ($f_1$=2.0, $f_2$=1.0) to the reaction solution b (defined as reaction solution 2-1 for discrimination) obtained by the method of Reference Example 4 at 100° C. under agitation to carry out a reaction at the same temperature for 2 hours. The black brown reaction solution changed into a pink turbid slurry. The slurry was then filtered in the same manner as in Example 1. Filtration proceeded very smoothly. The obtained filtrate was adsorbed to basic alumina to obtain an achromatic treated solution. The residual metals of the solution were measured by ICP emission spectral analysis. As a result, the amount of Zr was 0.1 ppm or less, that of B was 0.3 ppm or less, that of Co was 0.5 ppm or less and that of Al was 1.2 ppm based on the polymer. It was found from this that the polymer had very high purity. The unreacted product and the solvent were distilled off (flushed) from the treated solution to obtain an achromatic polymer. According to the ultraviolet visible absorption spectrum of a toluene solution containing 20 wt % of the obtained polymer, the solution had a transmittance at 500 nm of 99% or more.

Example 3

Figure 8:
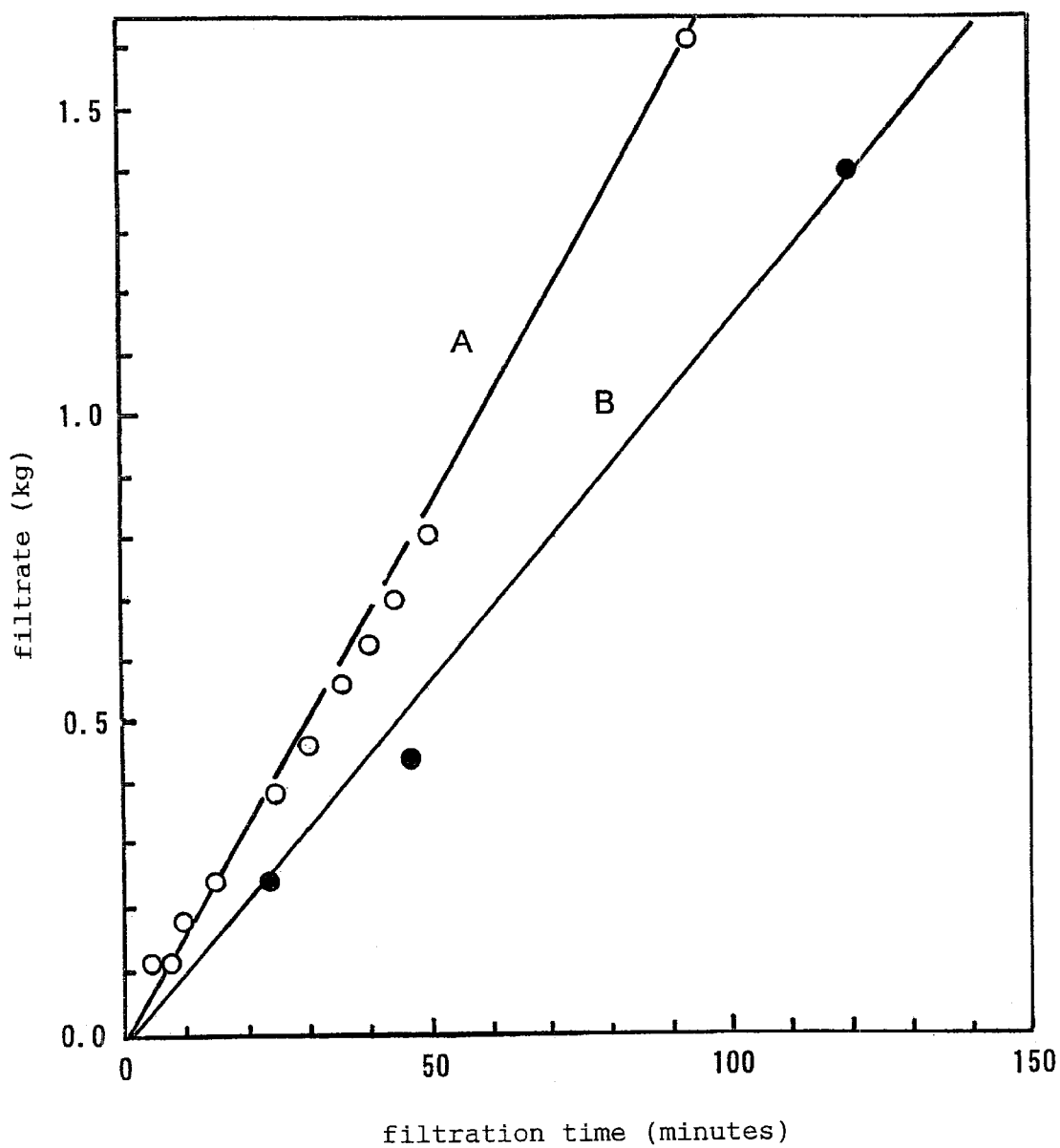
FIG. 8 shows the filtration curves of slurry 3-2 and slurry 4-2 obtained in Examples 3 and 4, wherein a curve A and a curve B are for the slurry 3-2 and the slurry 4-2, respectively.

A lactic acid aqueous solution comprising 28.9 g of lactic acid and 2.9 g of water ($f_1=2.0$, $f_2=1.0$) was added to the reaction solution b (defined as reaction solution 3-1 for discrimination) obtained by the method of Reference Example 4 at 100° C. under agitation to carry out a reaction at the same temperature for 2 hours. The black brown reaction solution changed into a pink turbid slurry (slurry 3-2). The slurry was then filtered in the same manner as in Example 1. Filtration pressure was changed to 4 kg/cm² (gauge pressure). Filtration proceeded very smoothly as shown in the curve A of FIG. 8 and about 1.6 kg of the slurry could be treated in 90 minutes. The obtained filtrate was adsorbed to basic alumina to obtain an achromatic transparent treated solution (treated solution 3-3). The residual metals of the solution were measured by ICP emission spectral analysis. As a result, the amount of Zr was 0.1 ppm or less, that of B was 0.1 ppm or less, that of Co was 0.3 ppm and that of Al was 0.7 ppm based on the polymer. It was found from this that the polymer had very high purity and that the amount of Al in particular was very small. The unreacted product and the solvent were distilled off (flushed) from the treated solution to obtain an achromatic transparent polymer (purified polymer 3-4). The sublimation of tris(acetylacetonate)aluminum was not observed during the treatment. A strong absorption based on tris(acetylacetonate)aluminum was not observed in the ultraviolet visible absorption spectrum of a toluene solution containing 20 wt % of the obtained polymer.

Figure 9:
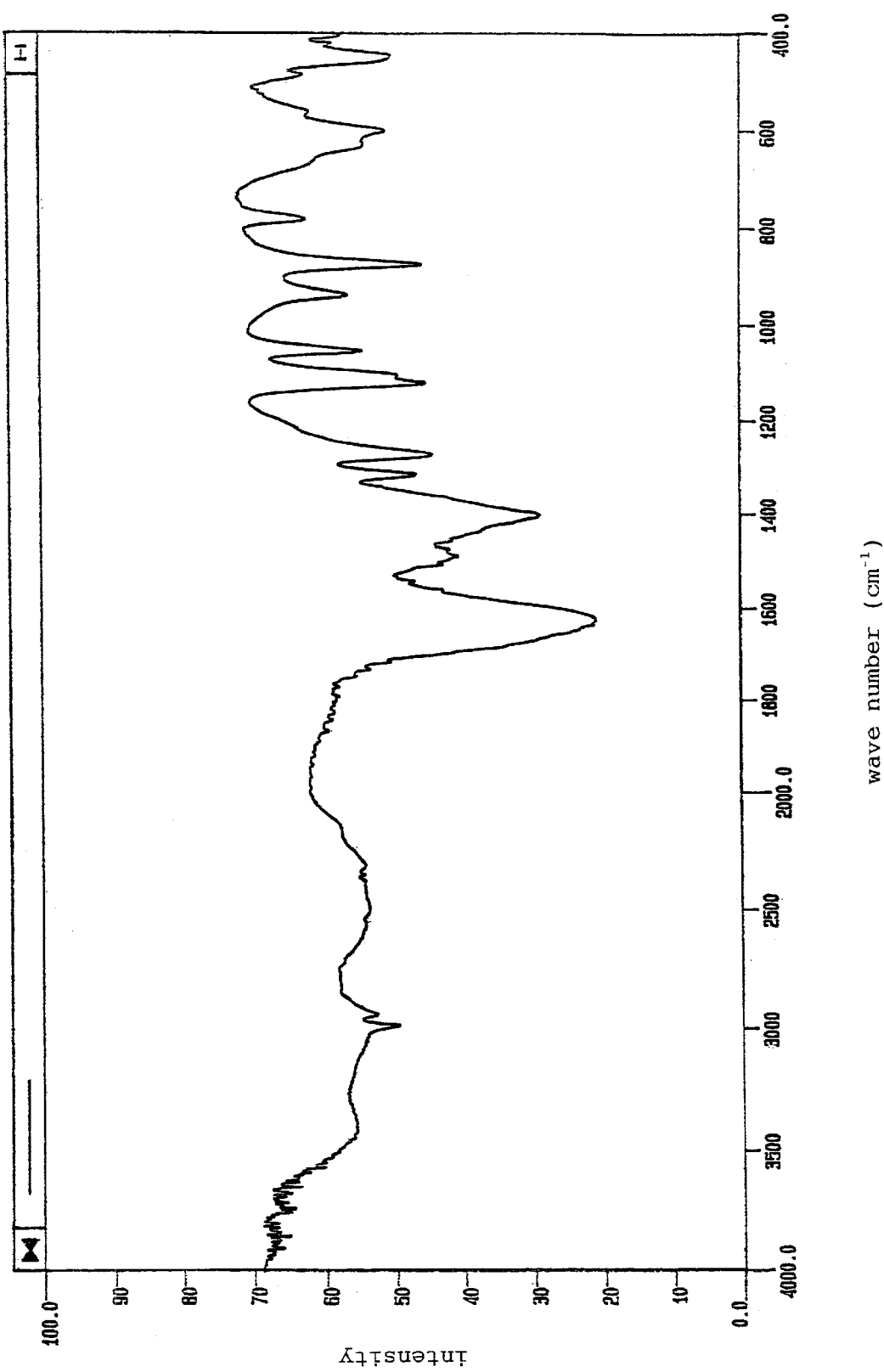
FIG. 9 shows the infrared absorption spectrum of a precipitate (precipitate 3-5) obtained in Example 3.
Figure 10:
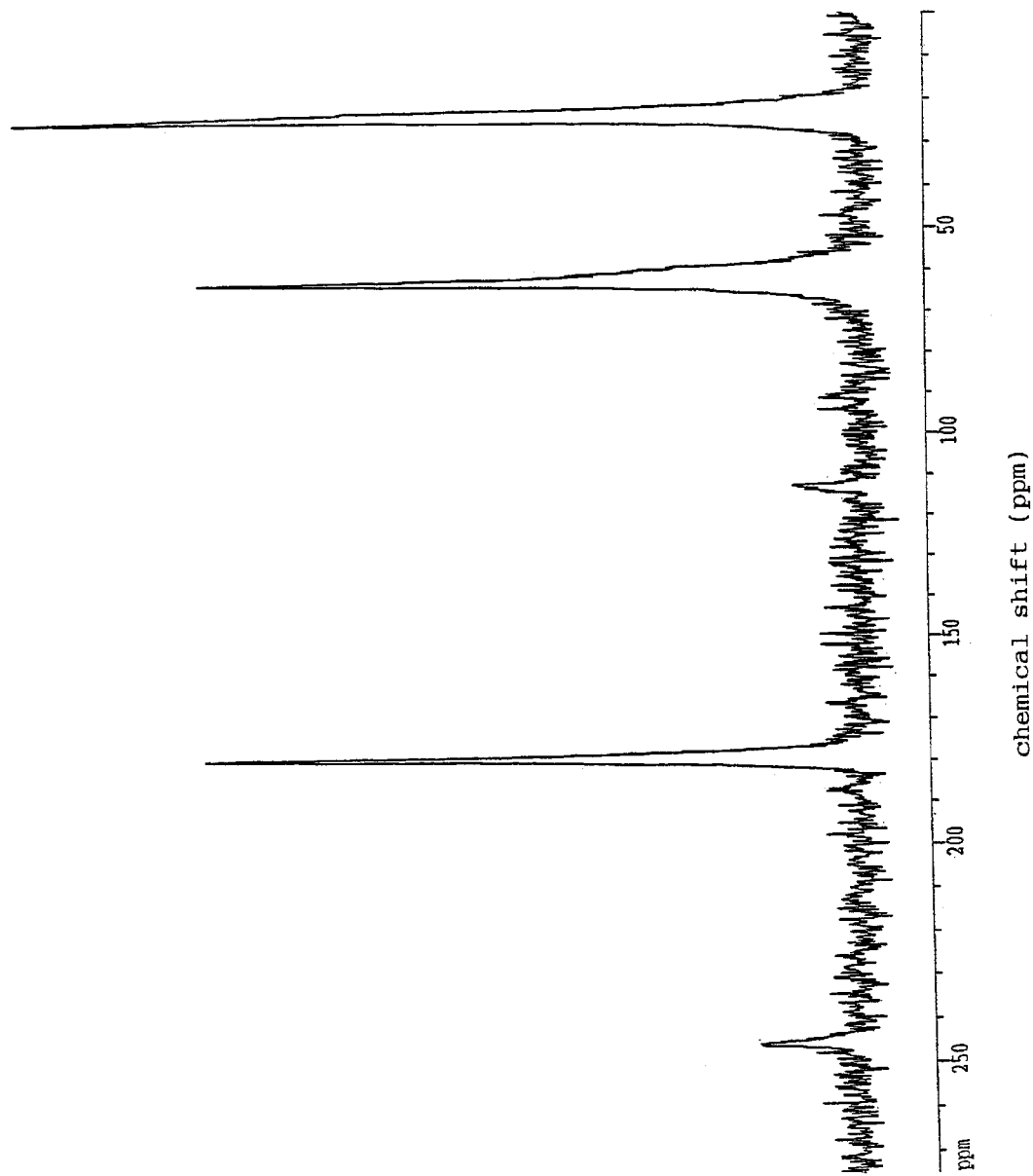
FIG. 10 shows the solid NMR spectrum of a precipitate (precipitate 3-5) obtained in Example 3.

Meanwhile, the precipitate (precipitate 3-5) was analyzed. While absorptions at around 1,520 cm⁻¹ and 1,540 cm⁻¹ based on tris(acetylacetonate)cobalt and tris(acetylacetonate)aluminum were not observed in the infrared absorption spectrum of the precipitate (FIG. 9), a strong absorption based on a lactate was observed. A peak based on a lactate was observed at around 23 ppm (CH₃), 63 ppm (>CH—) and 180 ppm (—COO—) in the solid ¹³C-NMR spectrum of the precipitate (FIG. 10). These results show that tris(acetylacetonate)cobalt and triisobutyl aluminum which were catalyst components used in large quantities precipitated effectively as lactates.

Example 4

A solution comprising 21.7 g of lactic acid and 2.9 g of water ($f_1=1.5$, $f_2=1.0$) was added to the reaction solution b (defined as reaction solution 4-1 for discrimination) obtained by the method of Reference Example 4 at 100° C. under agitation to carry out a reaction at the same temperature for 2 hours. The black brown reaction solution changed into a pink turbid slurry (slurry 4-2). The slurry was then filtered in the same manner as in Example 1. Filtration proceeded very smoothly as shown in the curve B of FIG. 8. The obtained filtrate was adsorbed to basic alumina to obtain an achromatic treated solution (treated solution 4-3). The residual metals of the solution were measured by ICP emission spectral analysis. As a result, the amount of Zr was 0.1 ppm or less, that of B was 0.1 ppm or less, that of Co was 0.6 ppm and that of Al was 0.9 ppm based on the polymer. It was found from this that the polymer had very high purity. The unreacted product and the solvent were distilled off (flushed) from the treated solution to obtain an achromatic polymer (purified polymer 4-4). The sublimation of tris(acetylacetonate)aluminum was not observed during the treatment. A strong absorption based on tris(acetylacetonate)aluminum was not observed in the ultraviolet visible absorption spectrum of a toluene solution containing 20 wt % of the obtained polymer. The solution had a transmittance at 500 nm of 99% or more.

Meanwhile, the precipitate (precipitate 4-5) was analyzed. While a peak at around 1,620 cm⁻¹ based on tris(acetylacetonate)cobalt and a peak at around 1,640 cm⁻¹ based on tris(acetylacetonate)aluminum were not observed in the infrared absorption spectrum of the precipitate, a strong absorption based on a lactate was observed at around 1,620 cm⁻¹ instead. These results show that tris(acetylacetonate)cobalt and triisobutyl aluminum, which were catalyst components used in large quantities, precipitated as lactates effectively.

Example 5

A solution comprising 28.9 g of lactic acid and 2.9 g of water ($f_1=2.0$, $f_2=1.0$) was added to the reaction solution b (defined as reaction solution 5-1 for discrimination) obtained by the method of Reference Example 4 at 100° C. under agitation to carry out a reaction at the same temperature for 2 hours. The black brown reaction solution changed into a pink turbid slurry. The slurry was then filtered in the same manner as in Example 1. Filtration proceeded very smoothly as in Example 1 and a filtrate was obtained. The residual metals of the solution were measured by ICP emission spectral analysis. As a result, the amount of Zr was 0.3 ppm or less, that of B was 0.4 ppm or less, that of Co was 0.8 ppm and that of Al was 2.7 ppm based on the polymer. It was found from this that the polymer had very high purity. The unreacted product and the solvent were distilled off (flushed) from the treated solution to obtain an achromatic polymer. The sublimation of tris(acetylacetonate)aluminum was not observed during the treatment. A strong absorption based on tris(acetylacetonate)aluminum was not observed in the ultraviolet visible absorption spectrum of a toluene solution containing 20 wt % of the obtained polymer.

Meanwhile, the precipitate was analyzed. No absorption based on acetylacetonate but a strong absorption based on a lactate was observed in the infrared absorption spectrum of the precipitate. These results show that tris(acetylacetonate)cobalt and triisobutyl aluminum, which were catalyst components used in large quantities, precipitated as lactates effectively.

Example 6

A solution comprising 5.0 g of lactic acid, 1.0 g of water and 3.5 g of ethylene glycol ($f_1=1.0$, $f_2=1.0$, $f_3=1.0$) was added to the reaction solution a (defined as reaction solution 6-1 for discrimination) obtained by the method of Reference Example 4 at 100° C. under agitation to carry out a reaction at the same temperature for 2 hours. The light yellow reaction solution changed into a light yellow turbid slurry. The slurry was then filtered in the same manner as in Example 1. Filtration proceeded very smoothly as in Example 1. The obtained filtrate was adsorbed to basic alumina to obtain an achromatic treated solution. The residual metals of the solution were measured by ICP emission spectral analysis. As a result, the amount of Zr was 0.1 ppm or less, that of B was 0.1 ppm or less and that of Al was 0.5 ppm based on the polymer. It was found from this that the polymer had very high purity. The treated solution was added to a large amount of methanol to be precipitated therein, and the obtained precipitate was then separated by filtration and dried to obtain an achromatic flaky polymer. A strong absorption was not observed in the ultraviolet visible absorption spectrum of a toluene solution containing 20 wt % of the obtained polymer, and the solution had a transmittance at 500 nm of 99% or more.

Meanwhile, the precipitate was analyzed. No absorption based on acetylacetonate but a strong absorption based on a lactate was observed in the infrared absorption spectrum of the precipitate.

Reference Example 5

The flaky polymer obtained in Example 6 was dissolved in 1,320 g of toluene introduced into an autoclave. The air in the autoclave filled with the solution was fully substituted with nitrogen gas. Then, 3.0 g of tris(acetylacetylacetonate) cobalt and 4.8 g of triisobutyl aluminum were added to the solution. Thereafter, a hydrogenation reaction was carried out at a hydrogen pressure of 45 atm. for 120 minutes to obtain a reaction solution. A small amount of the reaction solution was dispensed and precipitated in a large amount of methanol to prepare a measurement sample. It was found from the $^1$H-NMR spectrum of the sample that this polymer had a hydrogenation rate of 99.9 or more. The reduced viscosity ($\eta_{sp}/c$), measured at 30° C. in a 0.5% toluene solution, of the polymer was 0.47 dl/g. The Tg, measured by DSC, of the polymer was 149° C.

Example 7

A solution comprising 17.6 g of lactic acid and 1.8 g of water ($f_1=2$, $f_2=1$) was added to the reaction solution obtained in Reference Example 5 at 100° C. under agitation to carry out a reaction at the same temperature for 2 hours. The black brown reaction solution changed into a pink turbid slurry. The slurry was then filtered in the same manner as in Example 1. Filtration proceeded very smoothly as in Example 1. The obtained filtrate was adsorbed to basic alumina to obtain an achromatic treated solution. The residual metals of the solution were measured by ICP emission spectral analysis. As a result, the amount of Co was 0.4 ppm or less and that of Al was 0.7 ppm based on the polymer. It was found from this that the polymer had very high purity. The unreacted product and the solvent were distilled off (flushed) from the treated solution to obtain an achromatic polymer. The sublimation of tris (acetylacetonate)aluminum was not observed during the treatment. A strong absorption based on tris(acetylacetonate) aluminum was not observed in the ultraviolet visible absorption spectrum of a toluene solution containing 20 wt % of the obtained polymer. The solution had a transmittance at 500 nm of 99% or more.

Meanwhile, the precipitate was analyzed. No absorption based on acetylacetonate but a strong absorption based on a lactate was observed in the infrared absorption spectrum of the precipitate. These results show that tris(acetylacetonate) cobalt and triisobutyl aluminum, which were catalyst components used in large quantities, precipitated as lactates effectively.

Reference Example 6

There were injected 320 g of norbornene, 1,280 g of toluene and 44 ml of a 2M toluene solution of aluminoxane into a 2-liter autoclave. The air in the autoclave was substituted by ethylene at normal pressure and then pressurized with 4 atm. of ethylene, and 44 ml of a 2M aluminoxane solution containing 150 mg of isopropylidene-(9-fluorenyl) (cyclopentadienyl)zirconium dichloride was added to carry out polymerization at 30° C. During the polymerization, 3 atm. of ethylene was supplied continuously to obtain a reaction solution. The obtained ethylene-norbornene copolymer had a Tg of 182° C. and a reduced viscosity of 1.23 dl/g and the molar fraction of norbornene units in the copolymer was 57%.

Example 8

A lactic acid solution comprising 31.8 g of lactic acid and 3.2 g of water ($f_1=2.0$, $f_2=1.0$) was added to the reaction solution obtained in Reference Example 6 at 100° C. under agitation to carry out a reaction at the same temperature for 2 hours. The light yellow reaction solution changed into a light yellow turbid slurry. The slurry was then filtered in the same manner as in Example 1. Filtration proceeded very smoothly as in Example 1. The obtained filtrate was adsorbed to basic alumina to obtain an achromatic treated solution. The residual metals of the solution were measured by ICP emission spectral analysis. As a result, the amount of Zr was 0.1 ppm or less and that of Al was 2.1 ppm based on the polymer. It was found from this that the polymer had very high purity. The unreacted product and the solvent were distilled off (flushed) from the treated solution to obtain an achromatic polymer. According to the ultraviolet visible absorption spectrum of a toluene solution containing 20 wt % of the obtained polymer, the solution had a transmittance at 500 nm of 99% or more.

Meanwhile, the precipitate was analyzed. A peak based on a lactate was observed in the infrared absorption spectrum of the precipitate.

Comparative Example 1

A solution comprising 115.4 g of lactic acid and 11.6 g of water ($f_1=8$, $f_2=4$) was added to the reaction solution b (defined as reaction solution 7-1 for discrimination) obtained by the method of Reference Example 4 at 100° C. under agitation to carry out a reaction at the same temperature for 2 hours. The black brown reaction solution changed into a markedly turbid pink slurry. The supersaturated lactic acid aqueous solution was phase-separated. The lactic acid aqueous solution was removed from the slurry, and the toluene phase was filtered in the same manner as in Example 1. Filtration proceeded very smoothly. The obtained filtrate was adsorbed to basic alumina to obtain an achromatic treated solution. The residual metals of the solution were measured by ICP emission spectral analysis. As a result, the amount of Zr was 5 ppm, that of B was 8 ppm or less, that of Co was 15 ppm or less and that of Al was 32 ppm based on the polymer. Thus, the purity of the polymer was not so high. The unreacted product and the solvent were distilled off (flushed) from the treated solution to obtain a light brown polymer.

Comparative Example 2

A lactic acid aqueous solution comprising 0.75 g of lactic acid and 0.2 g of water ($f_1=0.05$, $f_2=0.05$) was added to the reaction solution b (defined as reaction solution 8-1 for discrimination) obtained by the method of Reference Example 3 at 100° C. under agitation to carry out a reaction at the same temperature for 2 hours. The obtained reaction solution remained brown. The slurry was then filtered. However, filtration was very difficult and the filtrate still remained brown.

Reference Example 7

285 g of 8-ethylidenetetracyclo[$4.4.0.1^{2.5}.1^{7.10}$]-3-dodecene, 1,100 g of toluene, 4.2 g of 1-hexene, 7.5 g of triethylamine and 15 g of triisobutyl aluminum were injected into a 3-liter stainless steel reactor, and 2.8 g of titanium tetrachloride was further added to carry out polymerization at −10° C. for 2 hours so as to obtain a solution of a ring-opening polymer. A polymer obtained by dispensing a small amount of the obtained solution and purifying it in accordance with a commonly used method had a reduced viscosity ($\eta_{sp}/c$), measured at 30° C. in a 0.5% toluene solution, of 0.65 dl/g and a Tg, measured by DSC, of 186° C.

Example 9

There were added 7.8 g of lactic acid and 1.0 g of water ($f_1=0.30$, $f_2=0.20$) to the reaction solution obtained in Reference Example 7 at 100° C. under agitation to carry out a reaction at the same temperature for 2 hours. The black brown reaction solution changed into a black turbid slurry. The slurry was then filtered in the same manner as in Example 1. Filtration proceeded very smoothly as in Example 1. The obtained filtrate was adsorbed to basic alumina to obtain an achromatic treated solution. The residual metals of the solution were measured by ICP emission spectral analysis. As a result, the amount of Ti was 0.4 ppm or less and that of Al was 2.6 ppm based on the polymer. It was found from this that the polymer had very high purity. The treated solution was added to a large amount of ethanol to be precipitated, and the obtained precipitate was then separated by filtration and dried to obtain an achromatic flaky polymer. According to the ultraviolet visible absorption spectrum of a toluene solution containing 20 wt % of the obtained polymer, the solution had a transmittance at 500 nm of 99% or more.

Reference Example 8

The flaky polymer obtained in Example 9 was dissolved in 1,100 g of toluene introduced into an autoclave. The air in the autoclave filled with the solution was fully substituted with nitrogen gas. Then, 3.0 g of tris(acetylacetonate)cobalt and 4.8 g of triisobutyl aluminum were added to the solution to carry out a hydrogenation reaction at a hydrogen pressure of 45 atm. for 120 minutes so as to obtain a reaction solution. A polymer obtained by dispensing a small amount of the obtained reaction solution and purifying it in accordance with a commonly used method had a hydrogenation rate of 99.9% or more according to its $^1$H-NMR spectrum. Further, the polymer had a reduced viscosity ($\eta_{sp}/c$), measured at 30° C. in a 0.5% toluene solution, of 0.53 dl/g and a Tg, measured by DSC, of 140° C.

Example 10

A lactic acid aqueous solution comprising 17.6 g of lactic acid and 1.8 g of water ($f_1=2.0$, $f_2=1.0$) was added to the reaction solution obtained in Reference Example 8 at 100° C. under agitation to carry out a reaction at the same temperature for 2 hours. The black brown reaction solution changed into a pink turbid slurry. The slurry was then filtered in the same manner as in Example 1. Filtration proceeded very smoothly as in Example 1. The obtained filtrate was adsorbed to basic alumina to obtain an achromatic treated solution. The residual metals of the solution were measured by ICP emission spectral analysis. As a result, the amount of Ti was 0.2 ppm or less, that of Co was 0.5 ppm or less and that of Al was 0.8 ppm based on the polymer. It was found from this that the polymer had very high purity. The unreacted product and the solvent were distilled off (flushed) from the treated solution to obtain an achromatic polymer. According to the ultraviolet visible absorption spectrum of a toluene solution containing 20 wt % of the obtained polymer, the solution had a transmittance at 500 nm of 99% or more.

What is claimed is:

1. A process for producing a cyclic olefin polymer in the presence of a transition metal catalyst component soluble in an organic solvent and an organic aluminum compound as catalysts, comprising the steps of:

adding at least one compound selected from the group consisting of an α-oxyacid and β-oxyacid having one hydroxyl group and one carboxyl group in the molecule and derivatives obtained by substituting the hydroxyl group thereof with an alkoxyl group, to a solution of a reaction product to precipitate compounds containing a transition metal and aluminum; and separating the precipitate by filtration.

2. The process of claim 1, wherein the transition metal catalyst component soluble in an organic solvent is selected from the group consisting of a metallocene catalyst component, metathesis catalyst component and Ziegler catalyst component.

3. The process of claim 2, wherein the transition metal of the metallocene catalyst component is selected from the group consisting of zirconium, titanium and hafnium.

4. The process of claim 2, wherein the transition metal of the metathesis catalyst component is selected from the group consisting of titanium, molybdenum, tungsten and rhenium.

5. The process of claim 2, wherein the transition metal of the Ziegler catalyst component is selected from the group consisting of vanadium, cobalt and nickel.

6. The process of claim 1, wherein the organic aluminum compound is selected from the group consisting of an alkyl aluminum compound and alkyl aluminoxane compound.

7. The process of claim 1, wherein the cyclic olefin polymer contains polymerized unit derived from a cyclic olefin represented by the following formula (I):

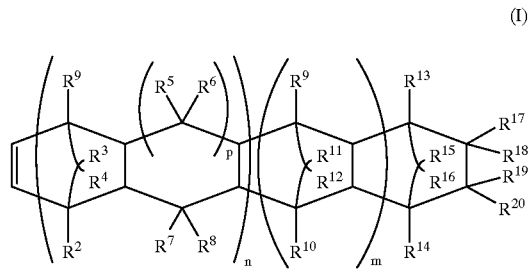

(I)

wherein n is 0 or 1, m is 0 or a positive integer, p is 0 or 1, $R^1$ to $R^{20}$ are the same or different and are each a hydrogen atom, halogen atom, aromatic hydrocarbon group having 6 to 10 carbon atoms or saturated or unsaturated aliphatic hydrocarbon group having 1 to 12 carbon atoms, and $R^{17}$ and $R^{18}$, or $R^{19}$ and $R^{20}$ may form an alkylidene group, $R^{17}$ or $R^{18}$, and $R^{19}$ or $R^{20}$ may form a ring, and the ring may have a double bond or aromatic ring.

8. The process of claim 1, wherein the α-oxyacid and β-oxyacid having one hydroxyl group and one carboxyl group in the molecule and the derivatives obtained by substituting the hydroxyl group thereof by an alkoxyl group are represented by the following formula (II):

(II)

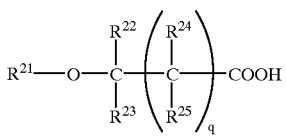

wherein q is 0 or 1, $R^{21}$ is a hydrogen atom or alkyl group having 1 to 5 carbon atoms, and $R^{22}$, $R^{23}$, $R^{24}$ and $R^{25}$ are the same or different and are each a hydrogen atom, alkyl group having 1 to 6 carbon atoms, phenyl group or benzyl group.

9. The process of claim 8, wherein the compound represented by the formula (II) has a boiling, point of about 200° C. or less at 10 mmHg.

10. The process of claim 8, wherein the compound represented by the formula (II) is added in an amount of 0.1 to 5 moles based on one equivalent of the total of the product of the number of moles of the transition metal catalyst component and the oxidation number of the transition metal and the product of the number of moles of the organic aluminum compound and the oxidation number of aluminum (3), which is obtained for the transition metal catalyst component and organic aluminum compound contained in a reaction system.

11. The process of claim 8, wherein a compound selected from the group consisting of water and an alcohol is added in addition to the compound represented by the formula (II).

12. The process of claim 11, wherein water is added in an amount of 0 to 9.9 moles based on one equivalent of the total of the product of the number of moles of the transition metal catalyst component and the oxidation number of the transition metal and the product of the number of moles of the organic aluminum compound and the oxidation number of aluminum (3), which is obtained for the transition metal catalyst component and organic aluminum compound contained in a reaction system.

13. The process of claim 11, wherein an alcohol is added in an amount of 0 to 5 moles based on one equivalent of the total of the product of the number of moles of the transition metal catalyst component and the oxidation number of the transition metal and the product of the number of moles of the organic aluminum compound and the oxidation number of aluminum (3), which is obtained for the transition metal catalyst component and organic aluminum compound contained in a reaction system.

14. The process of claim 1, wherein a reaction for producing the cyclic olefin polymer is an addition copolymerization reaction between an α-olefin having 2 or more carbon atoms and a cyclic olefin in a hydrocarbon solvent in the presence of a polymerization catalyst selected from the group consisting of a metallocene catalyst and Ziegler catalyst.

15. The process of claim 14, wherein after the above addition copolymerization reaction is carried out, a hydrogenation catalyst selected from the group consisting of a metallocene catalyst and Ziegler catalyst is added to the obtained homogeneous polymerization reaction solution to carry out hydrogenation.

16. The process of claim 14, wherein the metallocene catalyst is a combination of a metallocene catalyst component, an ionic boron compound and an alkyl aluminum compound or a combination of metallocene catalyst component and an alkyl aluminoxane.

17. The process of claim 15, wherein the metallocene catalyst contains a metallocene catalyst component and organolithium.

18. The process of claim 17, wherein a compound represented by the formula (II):

(II)

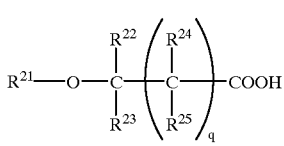

wherein q is 0 or 1, $R^{21}$ is a hydrogen atom or alkyl group having 1 to 5 carbon atoms, and $R^{22}$, $R^{23}$, $R^{24}$ and $R^{25}$ are the same or different and are each a hydrogen atom, alkyl group having 1 to 6 carbon atoms, phenyl group or benzyl group, is added in a total amount of 0.1 to 5 moles based on one equivalent of the total of the product of the number of moles of the transition metal catalyst component and the oxidation number of the transition metal, the product of the number of moles of the organic aluminum compound and the oxidation number of aluminum (3) and the product of the number of moles of an alkyl lithium and the oxidation number of lithium (1), which is obtained for the transition metal catalyst component, organic aluminum compound and alkyl lithium contained in a reaction system.

19. The process of claim 18, wherein a compound selected from the group consisting of water and an alcohol is added in addition to the compound represented by the formula (II).

20. The process of claim 19, wherein water is added in an amount of 0 to 9.9 moles based on the same standard as that in claim 18.

21. The process of claim 19, wherein an alcohol is added in an amount of 0 to 5 moles based on the same standard as that in claim 18.

22. The process of claim 15, wherein the Ziegler catalyst is a combination of an alkyl aluminum and a Ziegler catalyst component selected from the group consisting of tris(acetylacetonate)cobalt and bis(acetylacetonate)nickel.

23. The process of claim 1, wherein a reaction for producing the cyclic olefin polymer is the ring-opening polymerization reaction of a cyclic olefin in a hydrocarbon solvent in the presence of a metathesis catalyst.

24. The process of claim 23, wherein after the ring-opening polymerization is carried out, a hydrogenation catalyst selected from the group consisting of a metallocene catalyst and Ziegler catalyst is added to the obtained homogeneous polymerization reaction solution to carry out hydrogenation.

25. The process of claim 23, wherein the metathesis catalyst contains a metathesis catalyst component and an alkyl aluminum.

26. The process of claim 24, wherein the metallocene catalyst contains a metallocene catalyst component and organolithium.

27. The process of claim 26, wherein a compound represented by the above formula (II):

(II)

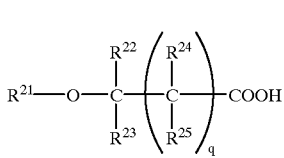

wherein q is 0 or 1, $R^{21}$ is a hydrogen atom or alkyl group having 1 to 5 carbon atoms, and $R^{22}$, $R^{23}$, $R^{24}$ and $R^{25}$ are the same or different and are each a hydrogen atom, alkyl group having 1 to 6 carbon atoms, phenyl group or benzyl group, is added in a total amount of 0.1 to 5 moles based on one equivalent of the total of the product of the number of moles of the transition metal catalyst component and the oxidation number of the transition metal, the product of the number of moles of the organic aluminum compound and the oxidation number of aluminum (3) and the product of the number of moles of an alkyl lithium and the oxidation number of lithium (1), which is obtained for the transition metal catalyst component, organic aluminum compound and alkyl lithium contained in a reaction system.

28. The process of claim 27, wherein a compound selected from the group consisting of water and an alcohol is added in addition to the compound represented by the formula (II).

29. The process of claim 28, wherein water is added in an amount of 0 to 9.9 moles based on the same standard as that in claim 27.

30. The process of claim 28, wherein an alcohol is added in an amount of 0 to 5 moles based on the same standard as that in claim 27.

31. The process of claim 24, wherein the Ziegler catalyst is a combination of an alkyl aluminum and a Ziegler catalyst component selected from the group consisting of tris (acetylacetonate)cobalt and bis(acetylacetonate) nickel.

32. The process of claim 1, wherein after the precipitate is filtered, the obtained reaction solution is either (1) brought into contact with an adsorbent or (2) washed with an aqueous solution, and then the reaction solvent is removed.

* * * * *

UNITED STATES PATENT AND TRADEMARK OFFICE
CERTIFICATE OF CORRECTION

PATENT NO. : 6,388,032 B1  
DATED : May 14, 2002  
INVENTOR(S) : Michio Yamaura et al.

Page 1 of 1

It is certified that error appears in the above-identified patent and that said Letters Patent is hereby corrected as shown below:

<u>Title page,</u>  
Item [73], Assignee should read as follows:  
-- [73] Assignee: Teijin Limited, Osaka (JP) and  
Bayer AG, Leverkusen (DE) --

Signed and Sealed this

Twenty-fifth Day of March, 2003

JAMES E. ROGAN  
*Director of the United States Patent and Trademark Office*